United States Patent
Hayashi et al.

(10) Patent No.: US 6,370,097 B1
(45) Date of Patent: Apr. 9, 2002

(54) INFORMATION RECORDING AND REPRODUCING METHOD, INFORMATION RECORDING AND REPRODUCING SYSTEM, INFORMATION RECORDING APPARATUS, AND INFORMATION REPRODUCING APPARATUS

(75) Inventors: Hideki Hayashi; Toshio Goto, both of Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/588,660

(22) Filed: Jun. 6, 2000

(30) Foreign Application Priority Data

Jun. 7, 1999 (JP) .......................................... 11-160196

(51) Int. Cl.$^7$ ................................................. G11B 5/76

(52) U.S. Cl. .................................. 369/59.11; 369/59.22; 369/124.02

(58) Field of Search ........................... 369/13.1, 47.19, 369/47.28, 47.35, 59.11, 59.12, 59.21, 59.22, 59.23, 59.24, 124.02, 124.04, 124.05; 360/29, 40

(56) References Cited

U.S. PATENT DOCUMENTS 5,535,245 A * 7/1996 Kim ............................ 360/29
6,246,640 B1 * 6/2001 Shimazaki et al. ......... 369/13.1
6,275,458 B1 * 8/2001 Wong et al. ............ 369/124.12

FOREIGN PATENT DOCUMENTS

JP  10-74322  3/1998

OTHER PUBLICATIONS

J. Bibb Cain et al., "Punctured Convolutional Codes of Rate (n–1)/n and Simplified Maximum Likelihood Decoding," IEEE Trans. on Information Theory, vol. IT–25, No. 1, Jan. 1979, pp. 97–100.

* cited by examiner

Primary Examiner—Paul W. Huber
(74) Attorney, Agent, or Firm—Morgan, Lewis & Bockius LLP

(57) ABSTRACT

An information recording and reproducing method is provided with an information recording method of optically recording digital data onto an information recording medium such as an optical disc etc., by forming a pit having a shape corresponding to the digital data, and an information reproducing method of optically reproducing the recorded digital data from the information recording medium. The information recording method is provided with: a record code generating process of applying an encoding process using a convolutional code onto the digital data, to thereby convert the digital data into a record code; a multi-level symbol generating process of converting the generated record code corresponding to a plurality of bits into a multi-level symbol having a plurality of values; a record symbol generating process of applying a logical converting process onto the generated multi-level symbol to thereby convert the multi-level symbol into a record symbol; and a recording process of recording the record symbol onto the information recording medium by optically forming the pit on the information recording medium while changing the shape of the pit by several steps in correspondence with a value of the generated record symbol. The information reproducing method is provided with: an irradiating process of irradiating a light beam for reproducing the digital data so that an irradiation range of the light beam on the information recording medium covers a plurality of pits.

14 Claims, 12 Drawing Sheets

DISC ROTATION DIRECTION

INFORMATION RECORDING AND REPRODUCING METHOD, INFORMATION RECORDING AND REPRODUCING SYSTEM, INFORMATION RECORDING APPARATUS, AND INFORMATION REPRODUCING APPARATUS

BACKGROUND OF THE INVENTION

1. Field of the Invention

The present invention relates to an information recording and reproducing method, an information recording and reproducing system, an information recording apparatus, and an information reproducing apparatus, and more particularly relates to an information recording and reproducing method, an information recording and reproducing system, an information recording apparatus and an information reproducing apparatus, which can record and reproduce digital data onto and from an information recording medium.

2. Description of the Related Art

There is a research with regard to a technique for recording or reproducing multi-level digital data having a plurality of values other than "0" or "1" onto or from an information recording medium in order to record or reproduce a large amount of digital data onto or from an optical disc as the information recording medium, at a high density.

Here, as a conventional technique in this field, there is a recording and reproducing method, which is a combination of (i) a pit edge multi-level recording method for changing the edge positions of a pit formed on the optical disc (namely, the positions of two edges of the pit in a rotational direction of the optical disc), by several steps in the rotational direction depending upon a value of digital data to be recorded to thereby record the digital data, and (ii) an RPR (Radial direction Partial Response) reproducing method for reproducing the recorded digital data by simultaneously reading the edges of pits on two tracks adjacent to each other. Such a recording and reproducing method is disclosed in detail in, for example, Japanese Patent Application Laid Open publication NO. Hei 10-74322.

Next, the above-mentioned information recording and reproducing method is schematically explained below with reference to FIG. 10 to FIG. 12C. FIG. 10 is a block diagram showing the schematic configuration of an information recording and reproducing system used in the information recording and reproducing method. FIG. 11 is an enlarged plan view showing an aspect of the pit on the optical disc. FIG. 12A to FIG. 12C are timing charts describing the information recording and reproducing method.

As shown in FIG. 10, a conventional information recording and reproducing system S' is provided with a recording system R' for digitally recording information data Sin onto an optical disc 1 and a reproducing system P' for reproducing the recorded information data Sin from the optical disc 1 to thereby generate reproduction data Sout.

Next, the detailed configuration and operation of the recording system R' is explained below.

As shown in FIG. 10, the recording system R' is provided with a Reed Solomon encoding unit 100, a mapping unit 101, a pre-coding unit 102, a pit edge modulating unit 103 and a recording head 104.

Next, the operations of the respective units are explained below.

The Reed Solomon encoding unit 100 performs an encoding process including an addition of a Reed Solomon error correction code onto the information data Sin, and generates an information code Se, and then outputs it to the mapping unit 101.

Accordingly, the mapping unit 101 converts the information code Se corresponding to a plurality of bits among the inputted information code Se, into a multi-level symbol Sts, and outputs it to the pre-coding unit 102. Actually, for example, the information code Se corresponding to three bits is converted into two of the multi-level symbols Sts having three levels of "0", "1" and "2".

Next, the pre-coding unit 102 performs a pre-coding operation onto the generated multi-level symbol Sts, and converts the multi-level symbol Sts into a record symbol Srs similarly having the three levels of "0", "1" and "2", and then outputs it to the pit edge modulating unit 103.

Then, the pit edge modulating unit 103 generates a record pulse Srp, whose edge positions (namely, a rising up position and a falling down position of the pulse) are changed by three steps in accordance with respective values in the generated record symbols Srs, and then outputs it to the recording head 104.

Accordingly, the recording head 104 irradiates a record laser light, whose intensity is modulated in accordance with the record pulse Srp, onto a track (not shown) of the optical disc 1, and forms on the track a pit row composed of pits having edges (implying two edges existing in a rotational direction of the optical disc 1, and hereafter, implying the same) at positions corresponding to the generated record pulse Srp.

The above-mentioned operations of the recording system R' enables the original information data Sin to be recorded on the optical disc 1, by using the pits in which the edge position is changed by the three steps.

The detailed configuration and operation of the reproducing system P' is explained below.

As shown in FIG. 10, the reproducing system P' is provided with a reproducing head 105, a waveform equalizer 106, a level judging unit 107, a remainder calculating unit 108, a reverse mapping unit 109 and a Reed Solomon decoding unit 110.

The operations of the respective units are explained below.

The reproducing head 105 irradiates a reproduction laser light having a constant intensity onto the optical disc 1, reads the formed pit row, generates an analog reproduction signal Spa having a level corresponding to the edge position of the pit, and outputs it to the waveform equalizer 106.

A beam spot formed on the optical disc 1 by the reproduction laser light is moved on a central line between two tracks adjacent to each other, and two pit edges on the two tracks adjacent to each other are read at the same time. Thus, a level of the generated analog reproduction signal Spa corresponds to an added value of the two record symbols Srs recorded on the two tracks adjacent to each other. In a case of the above-mentioned record symbol Srs having the three levels of "0", "1" and "2", the reproduction analog signal Spa takes five levels composed of "0" (if the values of the two record symbols Srs adjacent to each other are both "0"), "1" (if the values of the two record symbols Srs are "0" and "1"), "2" (if the values of the two record symbols Srs are "0" and "2", or both "1"), "3" (if the values of the two record symbols Srs are "1" and "2"), or "4" (if the values of the two record symbols Srs are both "2").

Next, the waveform equalizer 106 filters the generated reproduction analog signal Spa by using a filter having a frequency characteristic of a high frequency band emphasis type, and re-shapes its waveform, to thereby generate a re-shaped analog reproduction signal Sep. Then, the waveform equalizer 106 outputs it to the level judging unit 107.

Accordingly, the level judging unit 107 samples the re-shaped analog reproduction signal Sep by using a preset sampling clock, and compares its voltage level with four threshold levels, and then generates a judgment symbol Sjs of five levels corresponding to the reproduction analog signal Spa of the five levels, and further outputs it to the remainder calculating unit 108.

Next, the remainder calculating unit 108 calculates the respective remainders when the respective values ("0", "1", "2", "3" and "4") of the generated judgment symbol Sjs are divided by 3, and generates a reproduction symbol Sps having three levels of "0", "1" and "2", and then outputs it to the reverse mapping unit 109.

Then, the reverse mapping unit 109 carries out a converting process inverse to that of the mapping unit 101, and converts the two reproduction symbols Sps into a reproduction information code Spe of three bits, and then outputs it to the Reed Solomon decoding unit 110.

Finally, the Reed Solomon decoding unit 110 performs a demodulating process using the Reed Solomon error correction code onto the reproduction information code Spe, and generates the final reproduction data Sout, and then outputs it to the external portion.

In the above-mentioned information recording and reproducing system S', the pre-coding operation is done in the recording system R', and on the contrary, the addition of the two record symbols Srs and the remainder calculation are done in the reproducing system P'. Here, the pre-coding operation in the recording system R' and the addition/remainder calculation in the reproducing system P' have the relationship of the calculation inverse to each other. Thus, the original information data Sin can be recovered as the reproduction data Sout, through the recording system R' and the reproducing system P'.

Next, the shape of the pit in the optical disc 1 is explained below with reference to FIG. 11.

As shown in FIG. 11, in the pit edge multi-level recording method, the pit row having a constant cycle is formed with pits PT on a track TR. Also, the position of the pit edge in each pit PT is changed by the three steps in the rotational direction of the optical disc 1, in accordance with the value of the record symbol Srs of the above-mentioned three levels. In addition, in FIG. 11, the positions that can be considered as the position of the pit edge in each pit PT are all shown by using solid lines. Actually, the pit edge is formed at any one position of the three pit edge positions.

On the other hand, the reproduction laser light irradiated onto the optical disc 1 at the time of the reproduction generates a beam spot BS having an irradiation range represented by a circle in FIG. 11. Then, the movement of the beam spot BS on a central line L between two tracks TR represented by a dashed line enables the record symbols Srs recorded in the two pit edges on the two tracks TR to be read at the same time.

Next, an operational waveform in the information recording and reproducing system S' is explained below with reference to FIG. 12A, FIG. 12B and FIG. 12C. FIG. 12A is a timing chart showing an example of a waveform of the record pulse Srp. FIG. 12B is an enlarged plan view showing a shape of a corresponding pit PT on the optical disc 1, and FIG. 12C is a timing chart showing an example of a waveform of a corresponding analog reproduction signal Spa.

Here, FIG. 12A shows three kinds of rising up timings and falling down timings that can be considered as the record pulse Srp, under a condition that all of them overlap with each other. However, the record pulse Srp in the actual recording system R' has just one rising up timing and just one falling down timing of the three rising up timings and falling down timings shown in FIG. 12A.

In FIG. 12B, similarly to the case of FIG. 11, the actual pit PT has a pit edge at only one position of the three pit edge positions.

Moreover, FIG. 12C shows many waveforms that can be detected as the analog reproduction signal Spa, under the condition that all of them overlap with each other. However, the analog reproduction signal Spa in the actual reproducing system P' has just one waveform of the many waveforms shown in FIG. 12C. Furthermore, FIG. 12C shows a case that a level of the analog reproduction signal Spa becomes higher when the pit PT is read.

As shown in FIG. 12A, the record pulse Srp is generated which has a constant cycle 2T. A central value of a length of the pulse is "T" (this implies a length of a time period while the record pulse Srp is at a "HIGH" level, and hereafter, also implies the same).

Also, the rising up timing and the falling down timing of the record pulse Srp are respectively changed by the three steps, under a step width of a time period 3t, in accordance with a content of the record symbol Srs. Actually, if the value of the record symbol Srs is "0", the rising up timing or the falling down timing is shifted by the time period 3t, in a direction in which the pulse length in the record pulse Srp is made shorter. On the other hand, if the value of the record symbol Srs is "1", the rising up timing or the falling down timing is set at respective central values. Moreover, if the value of the record symbol Srs is "2", the rising up timing or the falling down timing is similarly shifted by the time period 3t, in a direction in which the pulse length is made longer.

As a result, the pulse length of the record pulse Srp can take five values of "T−6t", "T−3t", "T", "T+3t" and "T+6t".

In accordance with the record pulse Srp having such a waveform, the pit PT on the optical disc 1 is formed to have the constant cycle 2D, as shown in FIG. 12B, and a central value of each pit length is "D".

Moreover, the position of the edge of each pit PT is changed by the three steps under a step width of each distance 3$d$, in accordance with the waveform of the record pulse Srp.

As a result, the pit length of the pit PT can take five values of "D−6d", "D−3d", "D", "D+3d" and "D+6d".

Next, at the time of the reproduction, the voltage level of the analog reproduction signal Spa is sampled, for example, at the sampling points indicated at the times t1, t2, t3 and t4 shown in FIG. 12C.

At this time, the voltage level is changed by five steps under a step width of a voltage 3$e$ with a central value as "E", in accordance with the positions of the respective edges in the two pits PT read by the reproducing head 105 at the same time. As a result, when the sum of the two record symbols Srs corresponding to the two edges read at the same time is "0", "1", "2", "3" or "4", respectively, the voltage level of the analog reproduction signal Spa is "E−6e", "E−3e", "E", "E+3e" or "E+6e", respectively. Then, those voltage levels are compared with the four threshold levels having the values "E−4. 5e", "E−1. 5e", "E+1. 5e" and "E+4. 5e", respectively. Then, the above-mentioned judgment symbol Sjs can be determined if the level judgment is done by the level judging unit 107.

Then, the reproduction symbol Sps can be recovered as the remainder calculating unit 108 performs the remainder calculation onto the judgment symbol Sjs.

As mentioned above, the pit edge multi-level recording method records the record symbol Srs onto the optical disc 1 as the change of the position of the pit edge, and then judges the voltage level of the analog reproduction signal Spa obtained by the reproduction from the optical disc 1. Accordingly, the multi-level symbol Sts can be recovered as the reproduction symbol Sps.

However, in the above mentioned information recording and reproducing system S', if it is assumed to record the record symbols Srs of two values in one pit edge, and to read only one pit edge at one time, the voltage levels of the analog reproduction signals Spa representing one record symbols Srs are separated by "12e" from each other.

On the contrary, if the record symbols Srs of the three values are recorded in one pit edge and two pit edges are read at one time, as mentioned above, the voltage levels of the analog reproduction signals Spa representing two record symbols Srs are separated only by "3e" from each other.

In this case, the level of the analog reproduction signal Spa is subdivided by recording the multi-level record symbol Srs and by detecting the plurality of pit edges at one time. This subdivision reduces the S/N ratio of the analog reproduction signal Spa when its voltage level is judged.

In the reproduction process, the SIN ratio may be further reduced by various disturbances such as a disc noise included in the optical disc 1, or a laser noise included in the reproduction laser light, or a circuit noise, or servo errors (a focus error or a tracking error of the reproducing head 105), or disc tilt (i.e., a deviation from a right angle of the angle between an optical axis of the reproduction laser light and an information recording surface of the optical disc 1). If the S/N ratio is further reduced, or if the waveform of the analog reproduction signal Spa is distorted by these disturbances, it is further difficult to judge the voltage level of the analog reproduction signal Spa accurately.

As mentioned above, if the multi-level digital data is recorded onto or reproduced from the optical disc 1, the various disturbances cause the error rate of the reproduction data Sout to be easily deteriorated, which results in a problem of a reduction in a reliability as the information recording and reproducing system S'.

SUMMARY OF THE INVENTION

The present invention is proposed in view of the above mentioned problems. It is therefore an object of the present invention to provide an information recording and reproducing method, an information recording and reproducing system, an information recording apparatus and an information reproducing apparatus, which can avoid a deterioration of an error rate in reproduction data, even if multi-level digital data is optically recorded onto or reproduced from an information recording medium and there is a possibility that various disturbances may be applied onto it, and which can improve a reliability of the system or apparatus.

The above object of the present invention can be achieved by an information recording and reproducing method provided with an information recording method of optically recording digital data onto an information recording medium such as an optical disc etc., by forming a pit having a shape corresponding to the digital data, and an information reproducing method of optically reproducing the recorded digital data from the information recording medium. The information recording method is provided with: a record code generating process of applying an encoding process using a convolutional code onto the digital data, to thereby convert the digital data into a record code; a multi-level symbol generating process of converting the generated record code corresponding to a plurality of bits into a multi-level symbol having a plurality of values; a record symbol generating process of applying a logical converting process onto the generated multi-level symbol to thereby convert the multi-level symbol into a record symbol; and a recording process of recording the record symbol onto the information recording medium by optically forming the pit on the information recording medium while changing the shape of the pit by several steps in correspondence with a value of the generated record symbol. The information reproducing method is provided with: an irradiating process of irradiating a light beam for reproducing the digital data so that an irradiation range of the light beam on the information recording medium of the light beam covers a plurality of pits; a detecting process of detecting the record symbol as an analog detection signal, on the basis of a reflection light of the light beam from the irradiation range; an analog-to-digital converting process of converting the analog detection signal into a sample value series, which is a digital signal; and a recovering process of applying a Viterbi decoding process onto the converted sample value series to thereby recover the digital data.

According to the information recording and reproducing method of the present invention, at the time of recording the information, the record symbol, which is generated by the encoding processing using the convolutional code, is recorded onto the information recording medium as the shape of the pit is changed by the several steps. At the time of reproducing the information, the light beam is irradiated so that a plurality of pits are within the irradiation range, and the original digital data is reproduced by the Viterbi decoding process on the basis of the reflection light of the irradiated light beam. Thus, even if there are various external disturbances in case that the digital data is recorded as the shape of the pit is changed by the several steps, it is possible to reduce the error rate and reproduce the digital data.

Therefore, since the error rate at the time of reproducing the information can be reduced even in the information recording and reproducing system which is subjected to the various external disturbance, it is possible to improve the reliability of the information recording and reproducing system.

In one aspect of the information recording and reproducing method of the present invention, the record symbol generating process is provided with a pre-coding process of applying a pre-coding operation, which is set in advance in correspondence with the detecting process, onto (i) the multi-level symbol corresponding to one pit of the plurality of pits, which are within the irradiation range in the irradiating process, and (ii) the record symbol corresponding to another pit of the plurality of pits, which are within the irradiation range in the irradiating process, to thereby generate the record symbol corresponding to the one pit.

According to this aspect, the pre-coding process corresponding to the detecting process is applied onto the multi-level symbol corresponding to one pit of the plurality of pits within the irradiation range and the record symbol corresponding to another pit of the plurality of pits within the irradiation range, so that the record symbol corresponding to the one pit is generated. Thus, at the time of reproducing the information, it is possible to correctly recover the digital data, which is recorded in one pit, from the reflection light of a plurality of pits.

In another aspect of the information recording and reproducing method of the present invention, the convolutional code is a punctured code.

According to this aspect, it is possible to record the digital data with generating the record code at a high encoding rate.

In another aspect of the information recording and reproducing method of the present invention, in the multi-level symbol generating process, a converting process based on a Gray code is used to generate the multi-level symbol.

According to this aspect, it is possible to improve the reproduction capability at the time of reproducing the information.

In another aspect of the information recording and reproducing method of the present invention, a branch metric calculating process in the Viterbi decoding process compares values of a plurality of branch metrics with each other, and selects one branch metric having a minimum value.

According to this aspect, one branch metric having the minimum value is selected among a plurality of branch metrics in the Viterbi decoding process, and the pass metric is calculated by using the selected small number of branch metrics. Thus, it is possible to miniaturize a circuit for performing the Viterbi decoding process.

In another aspect of the information recording and reproducing method of the present invention, in the recording process, the pit is formed by changing an edge position of the pit by several steps in accordance with the value of the generated record symbol, and in the irradiating process, the light beam is irradiated such that a plurality of edge positions of the pits are within the irradiation range.

According to this aspect, since the position of the pit edge is the edge position corresponding to the multi-level record symbol, it is possible to accurately and easily reproduce the analog reproduction signal corresponding to the sum of the record symbol recorded on the plurality of pits, and it is further possible to more accurately reproduce the digital data.

The above object of the present invention can be achieved by an information recording and reproducing system provided with an information recording apparatus for optically recording digital data onto an information recording medium such as an optical disc etc., by forming a pit having a shape corresponding to the digital data, and an information reproducing apparatus for optically reproducing the recorded digital data from the information recording medium. The information recording apparatus is provided with: a record code generating device such as a convolutional encoding unit etc., for applying an encoding process using a convolutional code onto the digital data, to thereby convert the digital data into a record code; a multi-level symbol generating device such as a mapping unit etc., for converting the generated record code corresponding to a plurality of bits into a multi-level symbol having a plurality of values; a record symbol generating device such as a pre-coding unit etc., for applying a logical converting process onto the generated multi-level symbol to thereby convert the multi-level symbol into a record symbol; and a recording device such as a recording head etc., for recording the record symbol onto the information recording medium by optically forming the pit on the information recording medium while changing the shape of the pit by several steps in correspondence with a value of the generated record symbol. The information reproducing apparatus is provided with: an irradiating device such as a reproducing head etc., for irradiating a light beam for reproducing the digital data so that an irradiation range of the light beam on the information recording medium covers a plurality of pits; a detecting device such as a reproducing head etc., for detecting the record symbol as an analog detection signal, on the basis of a reflection light of the light beam from the irradiation range; an analog-to-digital converting device such as an A/D convertor etc., for converting the analog detection signal into a sample value series, which is a digital signal; and a recovering device such as a Viterbi decoding unit etc., for applying a Viterbi decoding process onto the converted sample value series to thereby recover the digital data.

According to the information recording and reproducing system of the present invention, at the time of recording the information, the record symbol, which is generated by the encoding processing using the convolutional code, is recorded onto the information recording medium as the shape of the pit is changed by the several steps. At the time of reproducing the information, the light beam is irradiated so that a plurality of pits are within the irradiation range, and the original digital data is reproduced by the Viterbi decoding process on the basis of the reflection light of the irradiated light beam. Thus, even if there are various external disturbances in case that the digital data is recorded as the shape of the pit is changed by the several steps, it is possible to reduce the error rate and reproduce the digital data.

Therefore, since the error rate at the time of reproducing the information can be reduced even in the information recording and reproducing system which is subjected to the various external disturbance, it is possible to improve the reliability of the information recording and reproducing system.

The above object of the present invention can be also achieved by an information recording apparatus for optically recording digital data onto an information recording medium such as an optical disc etc., by forming a pit having a shape corresponding to the digital data, which is optically reproduced from the information recording medium by irradiating a light beam for reproducing the digital data so that an irradiation range of the light beam on the information recording medium covers a plurality of pits and by applying a Viterbi decoding process onto an analog signal detected on the basis of a reflection light of the light beam from the irradiation range. The information recording apparatus is provided with: a record code generating device such as a convolutional encoding unit etc., for applying an encoding process using a convolutional code onto the digital data, to thereby convert the digital data into a record code; a multi-level symbol generating device such as a mapping unit etc., for converting the generated record code corresponding to a plurality of bits into a multi-level symbol having a plurality of values; a record symbol generating device such as a pre-coding unit etc., for applying a logical converting process onto the generated multi-level symbol to thereby convert the multi-level symbol into a record symbol; and a recording device such as a recording head etc., for recording the record symbol onto the information recording medium by optically forming the pit on the information recording medium while changing the shape of the pit by several steps in correspondence with a value of the generated record symbol.

According to the information recording apparatus of the present invention, at the time of recording the information, the record symbol, which is generated by the encoding processing using the convolutional code, is recorded onto the information recording medium as the shape of the pit is changed by the several steps. At the time of reproducing the information, the light beam is irradiated so that a plurality of pits are within the irradiation range, and the original digital data is reproduced by the Viterbi decoding process on the basis of the reflection light of the irradiated light beam. Thus, even if there are various external disturbances in case that the digital data is recorded as the shape of the pit is changed by the several steps, it is possible to reduce the error rate and reproduce the digital data.

Therefore, since the error rate at the time of reproducing the information can be reduced even in the information recording and reproducing system which is subjected to the various external disturbance, it is possible to improve the reliability of the information recording and reproducing system.

In one aspect of the information recording apparatus of the present invention, the record symbol generating device is provided with a pre-coding device for applying a pre-coding operation, which is set in advance in correspondence with a reproducing process for the digital data, onto (i) the multi-level symbol corresponding to one pit of the plurality of pits, which are within the irradiation range in the reproducing process, and (ii) the record symbol corresponding to another pit of the plurality of pits, which are within the irradiation range in the reproducing process, to thereby generate the record symbol corresponding to the one pit.

According to this aspect, the pre-coding process corresponding to the reproducing process for the digital data is applied onto the multi-level symbol corresponding to one pit of the plurality of pits within the irradiation range and the record symbol corresponding to another pit of the plurality of pits within the irradiation range, so that the record symbol corresponding to the one pit is generated. Thus, at the time of reproducing the information, it is possible to correctly recover the digital data, which is recorded in one pit, from the reflection light of a plurality of pits.

In another aspect of the information recording apparatus of the present invention, the convolutional code is a punctured code.

According to this aspect, it is possible to record the digital data with generating the record code at a high encoding rate.

In another aspect of the information recording apparatus of the present invention, in the multi-level symbol generating device, a converting process based on a Gray code is used to generate the multi-level symbol.

According to this aspect, it is possible to improve the reproduction capability at the time of reproducing the information.

In another aspect of the information recording apparatus of the present invention, by the recording device, the pit is formed by changing an edge position of the pit by several steps in accordance with the value of the generated record symbol, and in a reproducing process for the digital data, the light beam is irradiated such that a plurality of edge positions of the pits are within the irradiation range.

According to this aspect, since the position of the pit edge is the edge position corresponding to the multi-level record symbol, it is possible to accurately and easily reproduce the analog reproduction signal corresponding to the sum of the record symbol recorded on the plurality of pits, and it is further possible to more accurately reproduce the digital data.

The above object of the present invention can be also achieved by an information reproducing apparatus for optically reproducing digital data from an information recording medium such as an optical disc etc., on which the digital data is recorded by (i) applying an encoding process using a convolutional code onto the digital data, to thereby convert the digital data into a record code, (ii) converting the generated record code corresponding to a plurality of bits into a multi-level symbol having a plurality of values, (iii) applying a logical converting process onto the generated multi-level symbol to thereby convert the multi-level symbol into a record symbol, and (iv) recording the record symbol onto the information recording medium by optically forming a pit having a shape corresponding to the digital data on the information recording medium while changing the shape of the pit by several steps in correspondence with a value of the generated record symbol. The information reproducing apparatus is provided with: an irradiating device such as a reproducing head etc., for irradiating a light beam for reproducing the digital data so that an irradiation range of the light beam on the information recording medium covers a plurality of pits; a detecting device such as a reproducing head etc., for detecting the record symbol as an analog detection signal, on the basis of a reflection light of the light beam from the irradiation range; an analog-to-digital converting device such as an A/D convertor etc., for converting the analog detection signal into a sample value series, which is a digital signal; and a recovering device such as a Viterbi decoding unit etc., for applying a Viterbi decoding process onto the converted sample value series to thereby recover the digital data.

According to the information reproducing apparatus of the present invention, the digital data is recorded on the information recording medium by changing the shape of the pit by several steps in correspondence with the record symbol, which is generated by the encoding processing using the convolutional code. At the time of reproducing the information, the light beam is irradiated so that a plurality of pits are within the irradiation range, and the original digital data is reproduced by the Viterbi decoding process on the basis of the reflection light of the irradiated light beam. Thus, even if there are various external disturbances in case that the digital data is recorded as the shape of the pit is changed by the several steps, it is possible to reduce the error rate and reproduce the digital data.

Therefore, since the error rate at the time of reproducing the information can be reduced even in the information recording and reproducing system which is subjected to the various external disturbance, it is possible to improve the reliability of the information recording and reproducing system.

In one aspect of the information reproducing apparatus of the present invention, a branch metric calculating process in the Viterbi decoding process compares values of a plurality of branch metrics with each other, and selects one branch metric having a minimum value.

According to this aspect, one branch metric having the minimum value is selected among a plurality of branch metrics in the Viterbi decoding process, and the pass metric is calculated by using the selected small number of branch metrics. Thus, it is possible to miniaturize a circuit for performing the Viterbi decoding process.

The nature, utility, and further features of this invention will be more clearly apparent from the following detailed description with respect to preferred embodiments of the invention when read conjunction with the accompanying drawings briefly described below.

DETAILED DESCRIPTION OF THE PREFERRED EMBODIMENTS

Preferred embodiments of the present invention will be explained below with reference to the drawings. In the respective embodiments described below, the present invention is applied to an information recording and reproducing system for digitally recording record data onto an optical disc and then reproducing it to thereby obtain reproduction data.

(I) Embodiments

At first, the embodiments according to the present invention are described with reference to FIG. 1 to FIG. 8.

The entire configuration and operation of an information recording system as one of the embodiments are described with reference to FIG. 1 to FIG. 3.

Figure 1:
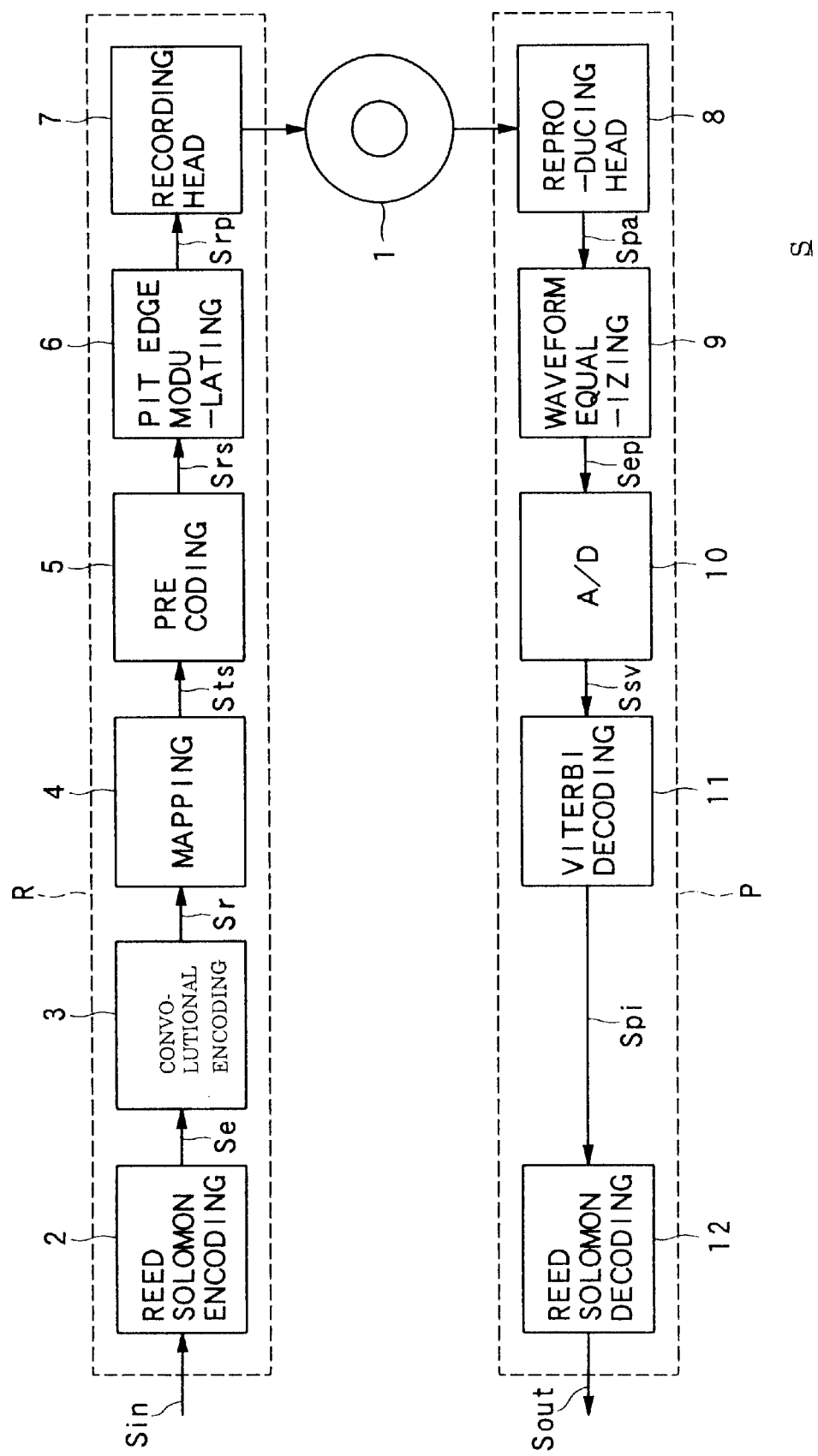
FIG. 1 is a block diagram showing a schematic configuration of an information recording and reproducing system of an embodiment.

FIG. 1 is a block diagram showing the schematic configuration of an information recording and reproducing system of the present embodiment. FIG. 2 is an enlarged plan view showing a pit shape on an optical disc according to the embodiment. FIG. 3A to FIG. 3C are timing charts to explain the operation of the information recording and reproducing system.

As shown in FIG. 1, an information recording and reproducing system S of the present embodiment is provided with a recording system R for digitally recording information data Sin onto an optical disc 1, and a reproducing system P for reproducing the recorded information data Sin from the optical disc 1 to thereby generate reproduction data Sout.

Next, the detailed configuration and operation of the recording system R will be described below.

As shown in FIG. 1, the recording system R is provided with a Reed Solomon encoding unit 2, a convolutional encoding unit 3 serving as a record code generating device, a mapping unit 4 serving as a multi-level symbol generating device, a pre-coding unit 5 serving as a record symbol generating device, a pit edge modulating unit 6 and a recording head 7 serving as a recording device.

Next, the operations of the respective units will be described below.

The Reed Solomon encoding unit 2 performs an encoding process including an addition of a Reed Solomon error correction code onto the information data Sin, and generates an information code Se, and then outputs it to the convolutional encoding unit 3.

Next, the convolutional encoding unit 3 performs an encoding process using a convolutional code onto the information code Se corresponding to a plurality of bits in the inputted information code Se, and generates a record code Sr, and then outputs it to the mapping unit 4. At this time, the convolutional encoding unit 3 converts an information code Se of three bits into the record code Sr of four bits (this case is represented by an encoding rate R=3/4). Incidentally, the detailed configuration of the convolutional encoding unit 3 will be described later.

Accordingly, the mapping unit 4 converts the record code Sr corresponding to a plurality of bits in the inputted record code Sr, into a multi-level symbol Sts, and then outputs it to the pre-coding unit 5. Actually, for example, the record code Sr corresponding to two bits is converted into one multi-level symbol Sts having four levels of "0", "1", "2" and "3". Incidentally, the detailed configuration of the mapping unit 4 will also be described later.

Next, the pre-coding unit 5 performs a pre-coding operation represented by a following equation (1) onto the generated multi-level symbol Sts, and converts the multi-level symbol Sts into a record symbol Srs similarly having the four levels of "0", "1", "2" and "3", and then outputs it to the pit edge modulating unit 6.

$$b(x,y)=[a(x,y)-b(x,y-1)] \bmod.4 \qquad (1)$$

Here, the a(x,y) is a value of the multi-level symbol Sts, the b(x,y) is a value of the record symbol Srs, the b(x,y−1) is a value of the record symbol Srs located ahead by an amount corresponding to one track, and the mod.4 is an equation indicating a remainder calculation with 4 as a modulus. Incidentally, the detailed configuration of the pre-coding unit 5 will also be described later.

Then, the pit edge modulating unit 6 generates a record pulse Srp, whose edge positions are changed by four steps in accordance with respective values in the generated record symbols Srs, and then outputs it to the recording head 7.

Accordingly, the recording head 7 irradiates a record laser light, whose intensity is modulated in accordance with the record pulse Srp, onto a track TR of the optical disc 1, and then forms on the track TR a pit row composed of pits having edges of positions corresponding to the generated record pulse Srp.

The above-mentioned operations of the recording system R enables the original information data Sin to be recorded onto the optical disc 1, through the pits whose edge positions are changed by the four steps.

Next, the detailed configuration and operation of the reproducing system P will be described below.

As shown in FIG. 1, the reproducing system P is provided with a reproducing head 8 serving as an irradiating device and a detecting device, a waveform equalizer 9, an A/D (Analog to Digital) converter serving as an analog to digital converting device, a Viterbi decoding unit 11 serving as a decoding device and a Reed Solomon decoding unit 12.

Next, the operations of the respective units will be described below.

The reproducing head 8 irradiates a reproduction laser light having a constant intensity onto the optical disc 1, and reads the formed pit row, and generates an analog reproduction signal Spa having a level corresponding to the edge position of the pit, and then outputs it to the waveform equalizer 9.

Here, a beam spot formed on the optical disc 1 by the reproduction laser light is moved on a central line between two tracks adjacent to each other, and two pit edges on the two tracks adjacent to each other are read at the same time. Thus, a level of the generated analog reproduction signal Spa corresponds to an added value of the two record symbols Srs recorded on the two tracks adjacent to each other.

Next, the waveform equalizer 9 filters the generated reproduction analog signal Spa by using a filter having a frequency characteristic of a high frequency band emphasis type, and re-shapes its waveform, and generates a re-shaped analog reproduction signal Sep, and then outputs it to the A/D converter 10.

Accordingly, the A/D converter 10 performs an A/D conversion onto the re-shaped analog reproduction signal Sep by using a sampling clock having a preset sampling frequency, and generates a sample value series Ssv, and then outputs it to the Viterbi decoding unit 11.

Here, in the above-mentioned operations of the recording system R, the reproducing head 8, the waveform equalizer 9 and the A/D converter 10, the two edges of the pits for recording therein the record symbol Srs having the four levels are read at the same time. As a result, the sample value series Ssv takes seven levels as represented by the following equation (2).

$$c(x,y)=b(x,y)+b(x,y-1) \quad (2)$$

Here, the b(x,y) is a value of the record symbol Srs, the b(x,y−1) is a value of the record symbol Srs located ahead by the amount corresponding to the one track, and the c(x,y) is a level of the sample value series Ssv.

Next, the Viterbi decoding unit 11 performs a Viterbi decoding operation onto the generated sample value series Ssv, in accordance with preset seven expectation values, and recovers an information code Spi, and then outputs it to the Reed Solomon decoding unit 12.

Here, the Viterbi decoding unit 11 collectively carries out the conversion process inverse to the conversion process from the information code Se to the record symbol Srs in the recording operation, and also carries out a calculation equivalent to a remainder calculation of a following equation (3), as described later.

$$d(x,y)=c(x,y) \bmod 4 \quad (3)$$

Here, the c(x,y) is a level of the sample value series Ssv, and the d(x,y) is a reproduction symbol.

Accordingly, the Viterbi decoding unit 11 can directly recover the information code Spi from the sample value series Ssv.

Finally, the Reed Solomon decoding unit 12 performs a demodulating process using the Reed Solomon error correction code onto the information code Spi, and generates a final reproduction data Sout, and then outputs it to external portion.

In the above-mentioned information recording and reproducing system S, the pre-coding operation represented by the equation (1) is done in the recording system R, and on the contrary, the symbol addition represented by the equation (2) and the remainder calculation represented by the equation (3) are done in the reproducing system P. Here, the pre-coding operation in the recording system R and the addition and remainder calculation in the reproducing system P have the relationship of the calculation inverse to each other. Thus, the original information data Sin can be recovered as the reproduction data Sout, by using the recording system R and the reproducing system P.

Next, the above-mentioned pit shape in the optical disc 1 will be described below with reference to FIG. 2.

Figure 2:
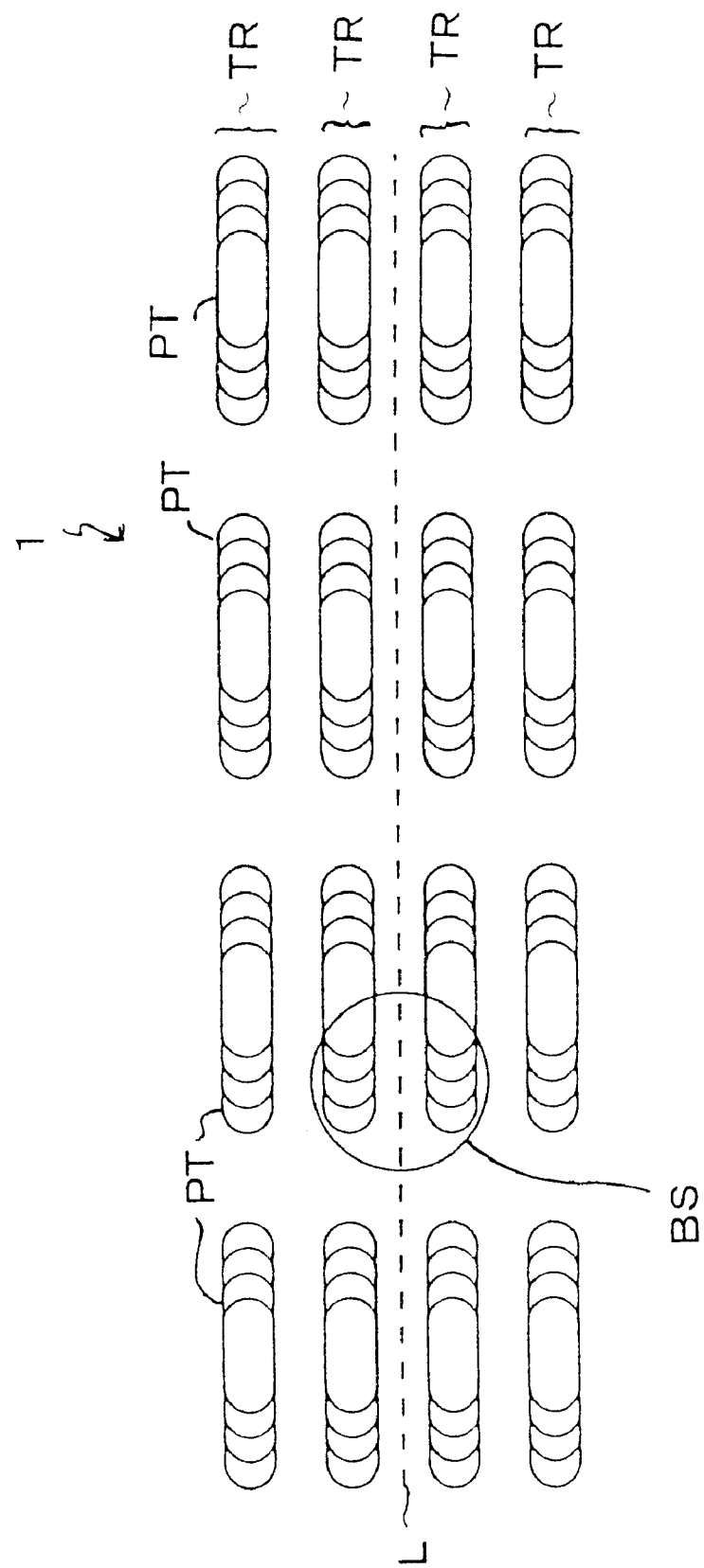
FIG. 2 is an enlarged plan view showing a pit shape in an optical disc of the embodiment.
Figure 3A:
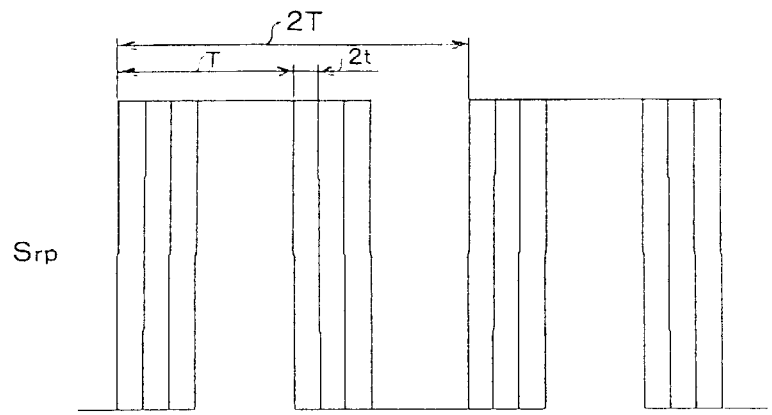
FIG. 3A is a timing chart showing an example of a waveform of a record pulse, to explain a recording and reproducing process of the embodiment.
Figure 3B:
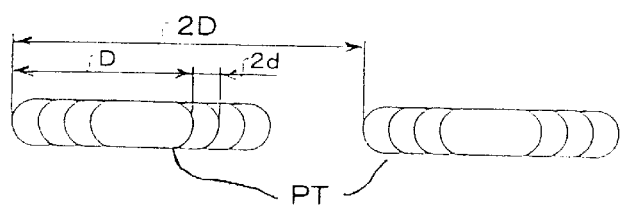
FIG. 3B is an enlarged plan view showing a pit shape in the optical disc to explain the recording and reproducing process of the embodiment.
Figure 3C:
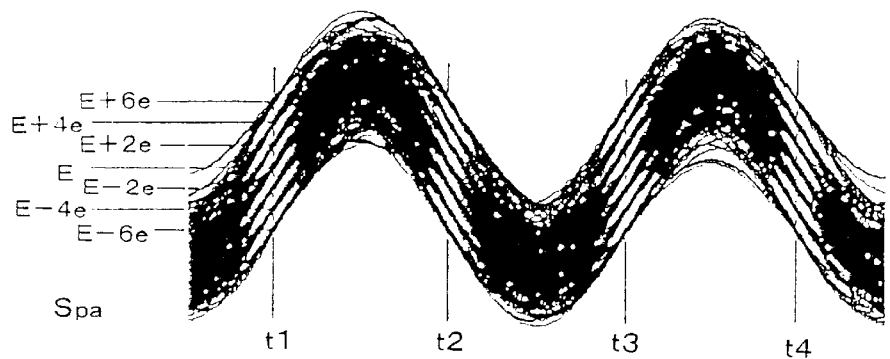
FIG. 3C is a timing chart showing an example of a waveform in an analog reproduction signal to explain the recording and reproducing process of the embodiment.

As shown in FIG. 2, in the pit edge multi-level recording method of the embodiment, the pit row having a constant cycle is formed with pits PT on a track TR. Also, the position of the pit edge in each pit PT is changed by the four steps in the rotational direction of the optical disc 1, in accordance with the value of the record symbol Srs of the above-mentioned four levels. In addition, in FIG. 2, the positions that can be considered as the position of the pit edge in each pit PT are all shown by using solid lines. Actually, the pit edge is formed at just one position of the four pit edge positions.

On the other hand, the reproduction laser light irradiated onto the optical disc 1 at the time of the reproduction generates a beam spot BS having an irradiation range represented by a circle in FIG. 2. Then, the movement of the beam spot BS on a central line L between two tracks TR represented by a dashed line enables the record symbols Srs recorded in the two pit edges on the two tracks TR to be read at the same time.

Next, the operational waveform in the information recording and reproducing system S will be described below with reference to FIG. 3A, FIG. 3B and FIG. 3C. FIG. 3A is a timing chart showing an example of a waveform of the record pulse Srp. FIG. 3B is an enlarged plan view showing a shape of a corresponding pit PT on the optical disc 1. FIG. 3C is a timing chart showing an example of a waveform in a corresponding analog reproduction signal Spa.

Here, FIG. 3A shows four kinds of rising up timings and falling down timings that can be considered as the record pulse Srp, under a condition that all of them overlap with each other. However, the record pulse Srp in the actual recording system R demonstrates just one rising up timing and just one falling down timing of the four rising up timings and falling down timings shown in FIG. 3A.

Also, in FIG. 3B, similarly to the case of FIG. 2, the actual pit PT has a pit edge at only one position of the four pit edge positions.

Moreover, FIG. 3C shows many waveforms that can be detected as the analog reproduction signal Spa, under the condition that all of them overlap with each other. However, the analog reproduction signal Spa in the actual reproducing system P demonstrates just one waveform of the many waveforms shown in FIG. 3C. Furthermore, FIG. 3C shows a case that a level of the analog reproduction signal Spa becomes higher when the pit PT is read.

As shown in FIG. 3A, the record pulse Srp is generated to have a constant cycle 2T. A central value of a length of the pulse is "T".

Also, the rising up timing and the falling down timing of the record pulse Srp are respectively changed by the four steps under a step width of a time period 2t, in accordance with a content of the record symbol Srs. Actually, if the value of the record symbol Srs is "0", the rising up timing or the falling down timing is shifted by a time period 3t, in a direction in which the pulse length in the record pulse Srp is made shorter. On the other hand, if the value of the record symbol Srs is "1", the rising up timing or the falling down timing is shifted by the time period t in the direction in which the pulse length is made shorter. Moreover, if the value of the record symbol Srs is "2", the rising up timing or the falling down timing is shifted by the time period t, in a direction in which the pulse length is made longer. On the other hand, if the value of the record symbol Srs is "3", the falling down timing or the rising up timing is shifted by the time period 3t, in the direction in which the pulse length is made longer.

As a result, the pulse length of the record pulse Srp can take seven values of "T−6t", "T−4t", "T−2t", "T", "T+2t", "T+4t" and "T+6t".

In accordance with the record pulse Srp having such a waveform, the pit PT on the optical disc 1 is formed to have the constant cycle 2D, as shown in FIG. 3B, and a central value of each pit length is "D".

Moreover, the position of the edge of each pit PT is changed by the four steps under a step width of each distance $2d$, in accordance with the waveform of the record pulse Srp.

As this result, the pit length of the pit PT can take seven values of "D−6d", "D−4d", "D−2d", "D", "D+2d", "D+4d" and "D+6d".

Next, at the time of the reproduction, the voltage level of the analog reproduction signal Spa is sampled, for example, at the sampling points indicated at the times t1, t2, t3 and t4 shown in FIG. 3C.

At this time, the voltage level is changed by seven steps under a step width of a voltage $2e$ with a central value as "E", in accordance with the positions of the respective edges in the two pits PT read by the reproducing head 8 at the same time. As a result, when the sum of the two record symbols Srs corresponding to the two edges read at the same time is "0", "1", "2", "3", "4e", "5" or "6", respectively, the voltage level of the analog reproduction signal Spa becomes "E−6e", "E−4e", "E−2e", "E", "E+2e", "E+4e" or "E+6e".

Here, in the above-mentioned conventional technique (refer to FIG. 10 to FIG. 12C), the amplitude $12e$ from the "E−6e" to the "E+6e" in the analog reproduction signal Spa is divided into the five steps at the step width $3e$. However, in the embodiment, the same amplitude $12e$ is divided into the seven steps at the step width $2e$. That is, in the embodiment, the number of levels in the record symbol Srs is increased by the convolutional encoding process in the convolutional encoding unit 3. Thus, the voltage level of the analog reproduction signal Spa is further subdivided as compared with the conventional technique.

Next, assuming that the levels of the sample value series Ssv having the seven steps obtained by performing the A/D conversion on the analog reproduction signal Spa are "S−6s", "S−4s", "S−2s", "S", "S+2s", "S+4s" and "S+6s", respectively, the Viterbi decoding unit 11 uses seven expectation values as reference levels, and then performs the Viterbi decoding process onto the A/D converted sample value series Ssv, to thereby recover the information code Spi.

As mentioned above, in the embodiment, the information code Se is converted to the record symbol Srs by the convolutional encoding operation, and the record symbol Srs, is recorded on the optical disc 1 as the change of the position of the pit edge. Then, the analog reproduction signal Spa reproduced from the optical disc 1 is converted to the information code Spi by the A/D conversion and the Viterbi decoding operation. Accordingly, it is possible to recover the information code Spi corresponding to the information code Se.

Next, the detailed configurations and operations of the portions according to the present invention in the recording system R will be described below with reference to FIG. 4 to FIG. 7.

Figure 4:
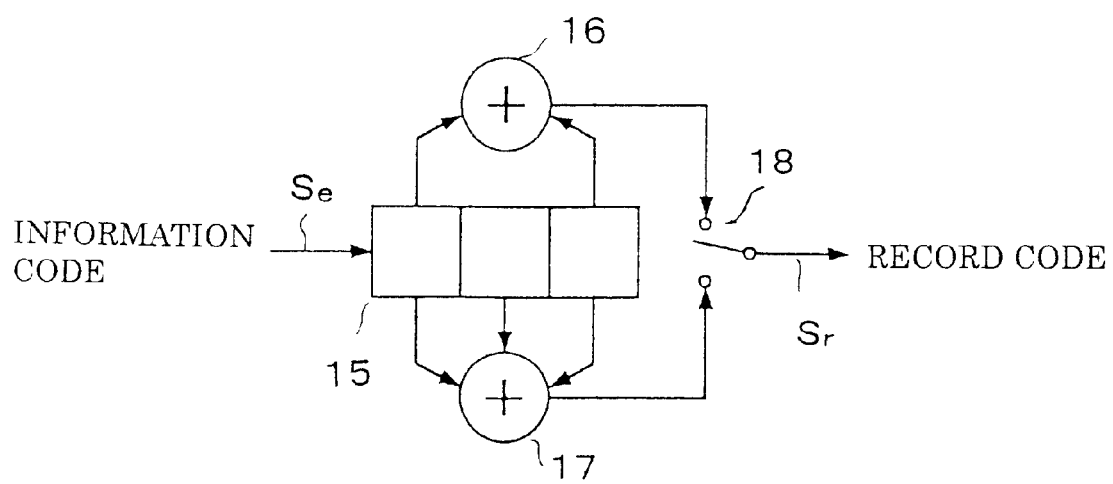
FIG. 4 is a block diagram showing a detailed configuration of a convolutional encoding unit in the embodiment.

At first, the detailed configuration and operation of the convolutional encoding unit 3 are described with reference to FIG. 4 to FIG. 6. FIG. 4 is a block diagram showing the detailed configuration of the convolutional encoding unit. FIG. 5A, FIG. 5B and FIG. 5C are block diagrams describing the operation. FIG. 6 is a trellis diagram corresponding to the convolutional encoding operation.

As shown in FIG. 4, the convolutional encoding unit 3 in the embodiment is provided with a shift register 15 of three bits, exclusive-OR operation circuits 16 and 17 and a switch 18. At this time, in the convolutional encoding unit 3, its constraint length ν is "2", and its generation coefficient is (5, 7, 5, 7).

Next, the operation of the convolutional encoding unit 3 is described below with reference to FIG. 5A to FIG. 5C.

Figure 5A:
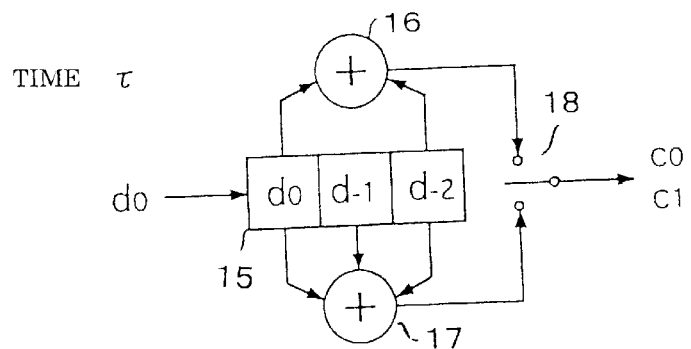
FIG. 5A is a block diagram describing an operation at a time τ, in an operation of the convolutional encoding unit of FIG. 4.
Figure 6:
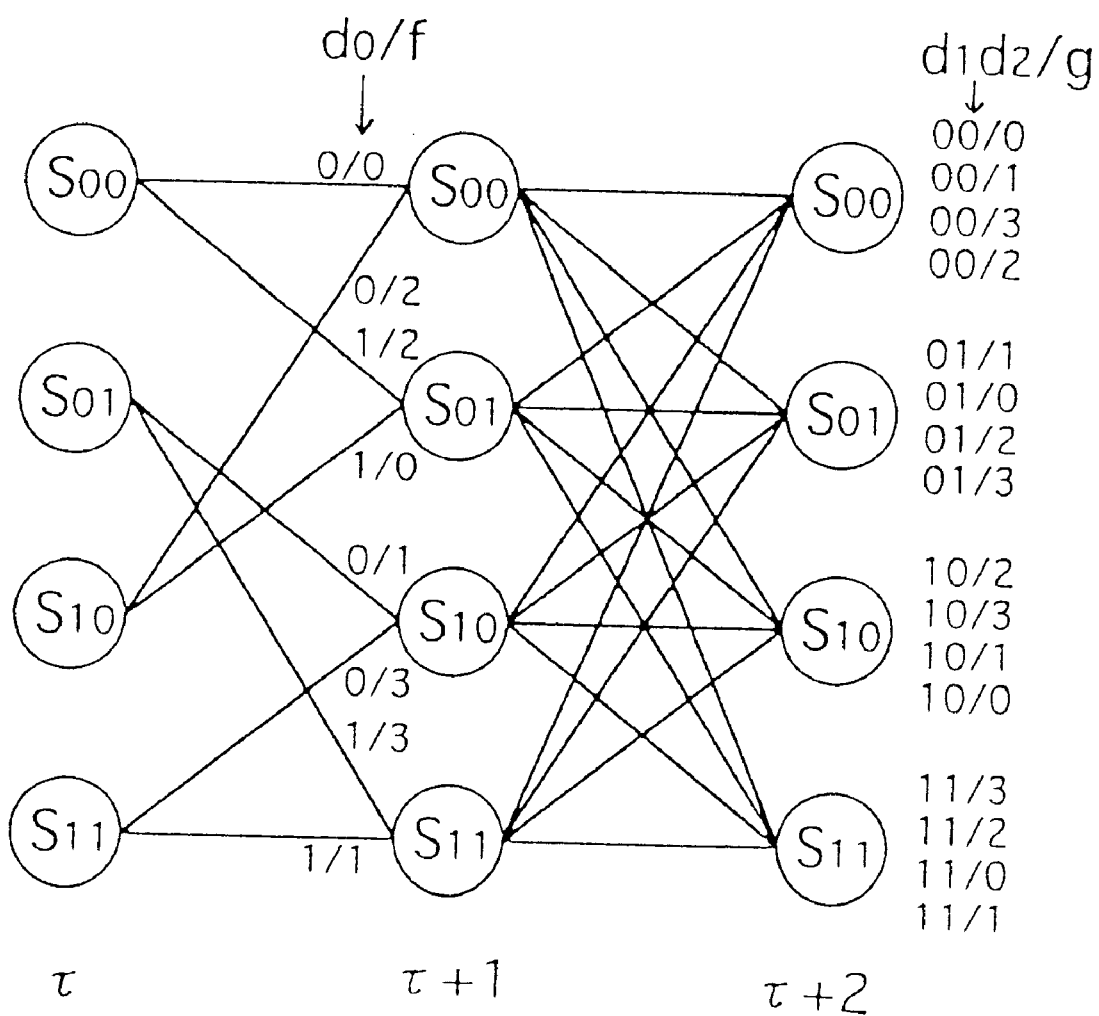
FIG. 6 is a trellis diagram showing a recording/reproducing process in the embodiment.

At first, as shown in FIG. 5A, when a value $d_0$ (hereafter, suitably indicated as an information code $d_0$) as an information code Se is inputted at a time τ, an upper contact and a lower contact alternately come in contact with a common contact of the switch 18 to thereby output values $c_0$ and $c_1$ (hereafter, suitably indicated as a record code $c_0$ or $c_1$) based on the following logical equations as the record code Sr.

$$c_0 = d_0 + d_{-2}$$

$$c_1 = d_0 + d_{-1} + d_{-2} \qquad (4)$$

Here, the information c odes $d_{-1}$ and $d_{-2}$ are the information codes Se respectively inputted to the register 15 at times τ−1 and τ−2. Also, the symbol "+" denotes an exclusive-OR operation process (implying the same in the following equations (5) and (6)).

Figure 5B:
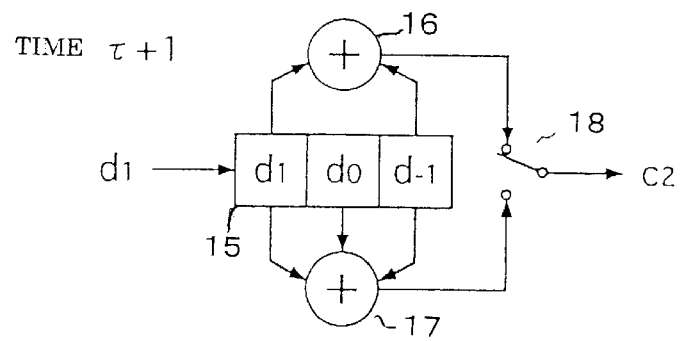
FIG. 5B is a block diagram describing an operation at a time τ+1, in an operation of the convolutional encoding unit of FIG. 4.

Next, as shown in FIG. 5B, when the information code $d_1$ is inputted to the shift register 15 at a time τ+1, the upper contact of the switch 18 comes in contact with the common contact thereof in FIG. 5B. Thus, a record code $c_2$ is outputted in accordance with the following logical equation.

$$c_2 = d_1 + d_{-1} \qquad (5)$$

Figure 5C:
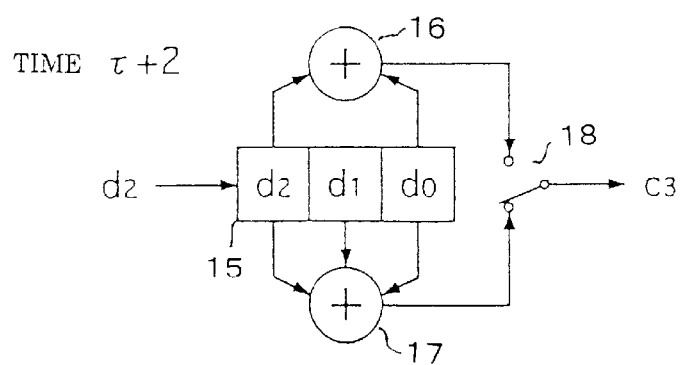
FIG. 5C is a block diagram describing an operation at a time τ+2, in an operation of the convolutional encoding unit of FIG. 4.

Finally, as shown in FIG. 5C, when the information code $d_2$ is inputted to the shift register 15 at a time τ+2, the lower contact of the switch 18 comes in contact with the common contact thereof in FIG. 5C. Thus, a record code $c_3$ is outputted in accordance with the following logical equation.

$$c_3 = d_2 + d_1 + d_0 \qquad (6)$$

After that, the repetition of the operations shown in FIG. 5A to FIG. 5C enables the information codes Se to be sequentially converted into the record codes Sr.

In the normal convolutional encoding process, the upper and lower contacts of the switch 18 always alternately come in contact with the common contact thereof. So, the input of the information code Se of one bit enables the record code Sr of two bits to be outputted. This is represented by an encoding rate R of 1/2.

In the convolutional encoding unit 3 of the embodiment, only one contact of the switch 18 comes in contact with the common contact thereof at the times τ+1 and τ+2. Thus, it is possible to reduce the number of bits in the data outputted as the record code Sr.

According to the operation of the convolutional encoding unit 3, the inputs of the information codes $d_0$, $d_1$ and $d_2$ of three bits enable the record codes $c_0$, $c_1$, $c_2$ and $c_3$ of four bits to be outputted. Thus, the encoding rate R becomes 3/4 in this case. Such a convolutional code is typically referred to as a "punctured code". Since the encoding rate is close to "1" in this code, the encoding operation can be effectively carried out. Moreover, the usage of the punctured code enables the number of bits in the record code Sr to be reduced. Thus, the number of record symbols Srs can be reduced, which is advantageous in the pit edge multi-level recording method.

A conversion rule of the mapping unit 4 will be described below with reference to a Table 1.

TABLE 1

| RECORD CODE | | MANY-VALUES SYMBOL |
|---|---|---|
| $C_0$ | $C_1$ | f |
| $C_2$ | $C_3$ | g |
| 0 | 0 | 0 |
| 0 | 1 | 1 |
| 1 | 0 | 3 |
| 1 | 1 | 2 |

As shown in the Table 1, the mapping unit 4 typically converts the record codes $c_0$, c1, $c_2$ and $c_3$ of four bits into multi-level symbols "f" and g, for each two bits.

Actually, the record codes $c_0$ and $c_1$ respectively shown on a left side of the Table 1 are converted into the multi-level symbols "f" respectively shown on a right side of the Table 1, and the record codes $c_2$ and $c_3$ respectively shown on the left side of the Table 1 are converted into the multi-level symbols "g" respectively shown on the right side of the Table 1. This conversion rule is referred to as a "Gray code".

Here, if the value of the multi-level symbol Sts is different by "1", the corresponding record code is different by one bit. This conversion based on the Gray code increases the minimum distance between paths in a later-described Viterbi decoding process, and improves the reproduction performance thereof.

In addition, the mapping unit 4 may be constituted by actually using ROM (Read Only Memory) or may be easily constituted by using a logical gate circuit.

Next, it is assumed that the converting process through the mapping operation and the convolutional encoding process in the recording system R as mentioned above is a sequential machine with finite states.

In the above-mentioned embodiment, a state of an encoding unit can be defined in accordance with the latest two bits of the information code Se inputted to the convolutional encoding unit 3 and the mapping unit 4 (hereafter, these two members are collectively referred to as the "encoding unit").

Next, the operation of the encoding unit as the sequential machine will be actually described below with reference to FIG. 5A, FIG. 5B and FIG. 5C.

As shown in FIG. 5A, in accordance with the states $d_{-2}$ and $d_{-1}$ in the shift register 15 at the time τ−1 and the information code do inputted at the time τ, the states $d_{-1}$ and $d_0$ in the shift register 15 at the time τ and the record codes $c_0$ and $c_1$ outputted at the time τ are determined, and accordingly the multi-level symbol f is determined.

Next, the time τ+1 shown in FIG. 5B and the time τ+2 shown in FIG. 5C are collectively considered. Then, in accordance with the states $d_1$ and $d_0$ in the shift register 15 at the time τ and the information codes $d_1$ and $d_2$ inputted at the times τ+1 and τ+2, the states $d_0$ and $d_1$ in the shift register 15 at the time τ+2 and the record codes $c_2$ and $c_3$ outputted at the times τ+1 and τ+2 are determined, and accordingly the multi-level symbol g is determined.

Next, the state transition when the encoding unit is considered as the sequential machine of the finite state will be described below with reference to a trellis diagram shown in FIG. 6. Here, a circle in FIG. 6 indicates the state of the encoding unit. Suffixes in the respective states S00, S01, S10 and S11 indicate two bit data for defining the respective states. Moreover, a line in FIG. 6 is referred to as a branch, which indicates the state transition of the encoding unit. Also, a symbol ((0/0) or (00/0) or the like) appended in each branch indicates the combination of the information code (one of $d_0$ to $d_2$) corresponding to each branch and the multi-level symbol (f or g). The converting process of the convolutional encoding process and the mapping process in the recording system R can be perfectly described by using the trellis diagram shown in FIG. 6.

As mentioned above, the multi-level symbol f is determined when the information code $d_0$ of one bit is inputted at the time τ. Thus, two branches are outputted from the respective states in FIG. 6. On the other hand, the multi-level symbol g is determined when the information codes $d_1$ and $d_2$ of two bits are inputted at the times τ+1 (and τ+2). Thus, four branches are outputted from the respective states in FIG. 6. Here, the reason why the structures of the trellis diagram shown in FIG. 6 are alternately changed is that the punctured code is used.

Figure 7:
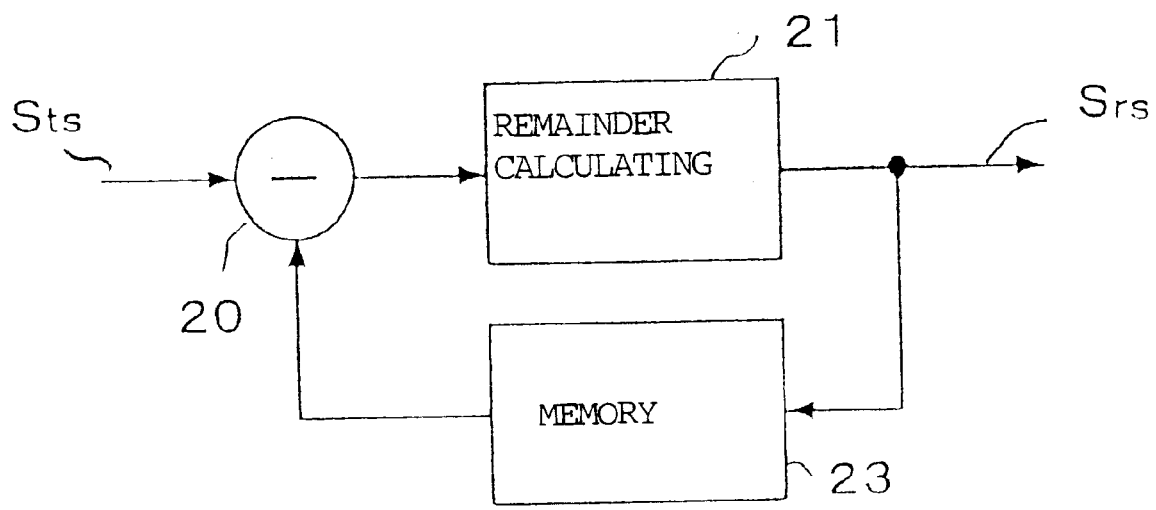
FIG. 7 is a block diagram showing a detailed configuration of a pre-coding unit in the embodiment.

Next, the detailed configuration and operation of the pre-coding unit 5 is described below with reference to FIG. 7. FIG. 7 is a block diagram showing the detailed configuration of the pre-coding unit 5.

As shown in FIG. 7, the pre-coding unit 5 is provided with a subtracting circuit 20, a remainder calculating circuit 21 for calculating a remainder with 4 as a modulus and a memory 23 for delaying a record symbol Srs by a time period corresponding to one track TR in the rotation of the optical disc 1.

Under this configuration, the pre-coding unit 5 executes the remainder calculation shown in the equation (1), and then converts the multi-level symbols f and g into the record symbols Srs having values F and G (hereafter, suitably indicated as the record symbols F and G).

Then, the operations of the pit edge modulating unit 6 and the recording head 7 enable the value of the record symbol F obtained by the above-mentioned series of processes to be recorded in, for example, a front edge of the pit PT, and the value of the record symbol G to be recorded in, for example, a rear edge of the pit PT.

Figure 8:
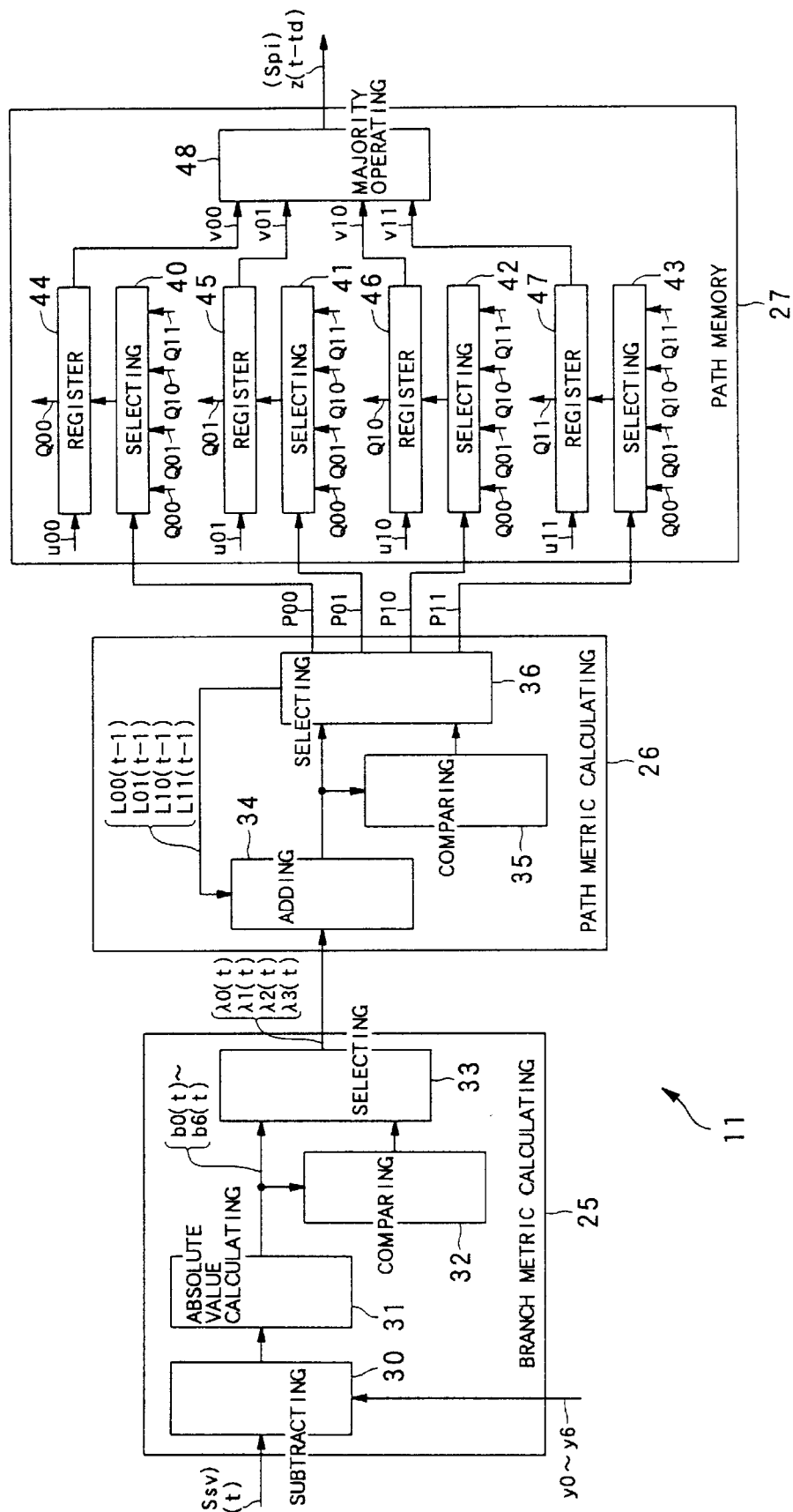
FIG. 8 is a block diagram showing a detailed configuration of a Viterbi decoding unit in the embodiment.

Next, the detailed configuration and operation of the Viterbi decoding unit 11 serving as the portion according to the present invention in the reproducing system P will be described below with reference to FIG. 6 and FIG. 8. FIG. 8 is a block diagram showing the detailed configuration of the Viterbi decoding unit 11.

As mentioned above, the reproducing process in the embodiment reads the pit row on the optical disc 1 by using the reproduction laser light, and obtains the analog reproduction signal Spa, and then performs the Viterbi decoding process onto the sample value series Ssv, which is obtained by A/D-converting the obtained analog reproduction signal Spa.

In the following explanation, it is assumed that the record symbol F recorded in the front edge of the pit PT by the above-mentioned operations in the recording system R is converted into an odd-numbered sample of the sample value series Ssv, and on other hand, the record symbol G recorded in the rear edge of the pit PT is converted into an even-numbered sample of the sample value series Ssv.

Also, the Viterbi decoding unit 11 functions on the basis of the trellis diagram shown in FIG. 6.

Actually, the Viterbi decoding unit 11 determines a path (namely, continuous branches) on the trellis diagram in which a distance to the input sample value series Ssv is the minimum, and then outputs the information code Spi corresponding to the determined path as a decoding series. In this way, the Viterbi decoding operation is done in accordance with the trellis diagram indicating the state transition of the recording system R. Thus, the information code Spi can be directly recovered from the sample value series Ssv, as mentioned above.

The detailed configuration and operation will be actually described below.

As shown in FIG. 8, the Viterbi decoding unit 11 is provided with a branch metric calculating unit 25, a path metric calculating unit 26 and a path memory 27.

Moreover, the branch metric calculating unit 25 is provided with a subtracting circuit 30, an absolute value calculating circuit 31, a comparing circuit 32 and a selecting circuit 33.

Also, the path metric calculating unit 26 is provided with an adding circuit 34, a comparing circuit 35 and a selecting circuit 36.

Furthermore, the path memory 27 is provided with four lines of selecting circuits 40 to 43, four lines of registers 44 to 47 and a majority operating circuit 48.

Next, the operations of the respective sections will be described below.

At first, the operation of the branch metric calculating unit 25 is described.

The subtracting circuit 30 in the branch metric calculating unit 25 reads out seven expectation values y0, y1, y2, y3, y4, y5 and y6 respectively having levels of "S−6"s, "S−4s", "S−2s", "S", "S+2s"), "S+4s" and "S+6s", from a memory (not shown), as mentioned above, and subtracts them from the sample value series Ssv (hereafter, suitably referred to as a sample value series x(t)) respectively, and then outputs the subtracted results to the absolute value calculating circuit 31, respectively.

Next, the absolute value calculating circuit 31 calculates the respective absolute values of the seven subtraction results to calculate distances b0(t), b1(t), b2(t), b3(t), b4(t), b5(t) and b6(t), and then outputs them to the comparing circuit 32 and the selecting circuit 33 respectively.

Those processes are represented by the following equations (7).

$$b0(t)=|x(t)-y0|$$
$$b1(t)=|x(t)-y1|$$
$$b2(t)=|x(t)-y2|$$
$$b3(t)=|x(t)-y3|$$
$$b4(t)=|x(t)-y4|$$
$$b5(t)=|x(t)-y5|$$
$$b6(t)=|x(t)-y6| \quad (7)$$

Here, in the embodiment, the absolute value calculation is performed on the subtraction result. Other than this, for example, it is possible to carry out a square calculation, or a folded line conversion in which a plurality of linear conversions are combined.

Accordingly, the comparing circuit 32 compares the magnitude relationships between the distances b0(t) and b4(t), between the distances b1(t) and b5(t) and between the distances b2(t) and b6(t), and then outputs the compared results to the selecting circuit 33.

Then, the selecting circuit 33 selects the minimum values from the respective compared results, and then outputs them to the path metric calculating unit 26 as branch metrics $\lambda 0(t)$, $\lambda 1(t)$, $\lambda 2(t)$, and $\lambda 3(t)$.

Those processes are represented by the following equations (8).

$$\lambda 0(t)=\min[b0(t), b4(t)]$$
$$\lambda 1(t)=\min[b1(t), b5(t)]$$
$$\lambda 2(t)=\min[b2(t), b6(t)]$$
$$\lambda 3(t)=b3(t) \quad (8)$$

Here, min[ ] implies the calculation for determining an element having the minimum value among elements included in the parentheses.

At this time, as indicated in the equations (8), the operation for selecting the minimum value from the branch metrics assigned the numbers respectively equal to the remainders when they are divided by 4 is equivalent to the operation of the remainder calculation in the equation (3). Then, the Viterbi decoding process typically determines the data series in which the distance is the minimum with respect to the input sample value. Thus, even if the minimum value of the distances is selected in advance as indicated in the equation (8), the data series obtained as the result is the same as that of the typical Viterbi decoding process. The above-mentioned selection of the branch metrics can reduce the circuit size of the Viterbi decoding unit 11.

The operation of the path metric calculating unit 26 will be described below.

The path metric calculating unit 26 adds the path metrics L00(t−1), L01(t−1), L10(t−1) and L11(t−1) at the time (t−1) to the branch metrics $\lambda 0(t)$, $\lambda 1(t)$, $\lambda 2(t)$ and $\lambda 3(t)$, and compares the magnitudes of added values, and selects the minimum value among them, and calculates the path metrics L00(t), L01(t), L10(t) and L11(t) at the time t. This calculation is typically referred to as an ACS (Add Compare Select) calculation.

Here, the Viterbi decoding unit 11 carries out the ACS calculations different between the odd-numbered sample and the even-numbered sample in accordance with the trellis diagram shown in FIG. 6.

That is, in a case of the odd-numbered sample, the following calculation is done.

$$L00(t)=\min[L00(t-1)+\lambda 0(t), L10(t-1)+\lambda 2(t)]$$
$$L01(t)=\min[L00(t-2)+\lambda 2(t), L10(t-1)+\lambda 0(t)]$$
$$L10(t)=\min[L01(t-1)+\lambda 1(t), L11(t-1)+\lambda 3(t)]$$
$$L11(t)=\min[L01(t-1)+\lambda 3(t), L11(t-1)+\lambda 1(t)] \quad (9)$$

In this case of the odd-numbered sample, the alternative selection is done as represented by the above-mentioned equation.

On the other hand, in a case of the even-numbered sample, the following calculation is done.

$$L00(t)=\min[L00(t-1)+\lambda0(t), L01(t-1)+\lambda1(t), L10(t-1)+\lambda3(t), L11(t-1)+\lambda2(t)]$$

$$L01(t)=\min[L00(t-1)+\lambda1(t), L01(t-1)+\lambda0(t), L10(t-1)+\lambda2(t), L11(t-1)+\lambda3(t)]$$

$$L10(t)=\min[L00(t-1)+\lambda2(t), L01(t-1)+\lambda3(t), L10(t-1)+\lambda1(t), L11(t-1)+\lambda0(t)]$$

$$L01(t)=\min[L00(t-1)+\lambda3(t), L01(t-1)+\lambda2(t), L10(t-1)+\lambda0(t), L11(t-1)+\lambda1(t)] \quad (10)$$

In this case of the even-numbered sample, the quadripartite selection is done as represented by the above-mentioned equation.

The selecting manners are different between the odd-numbered sample and the even-numbered sample, as mentioned above. Thus, the selecting circuit 36 switches its operation, and then carries out the alternative selection in the case of the odd-numbered sample, and carries out the quadripartite selection in the case of the even-numbered sample.

Moreover, the path metric calculating unit 26 generates the path selection signals P00, P01, P10 and P11 indicating the path selected as the result of the ACS calculation, and then outputs to the path memory 27. That is, those path selection signals P00, P01, P10 and P11 indicate which branch originating from the state at the time "t−1" minimizes the path metric at the time t.

Next, the operation of the path memory 27 will be described below.

Now, the respective registers 44 to 47 have the respective lengths of about 20 to 200 bits and a width of 2 bits, and store therein the four data series inputted from the respective selecting circuits 40 to 43 (the data series expected to be inputted to the convolutional encoding unit 3 in accordance with the trellis diagram shown in FIG. 6).

At this time, as shown in FIG. 8, the selecting circuits 40 to 43 select any one of four data series Q00, Q01, Q10 and Q11 from the respective registers 44 to 47, in accordance with the path selection signals P00, P01, P10 and P11 from the path metric calculating unit 26, and again output to the respective registers 44 to 47.

For each clock, the registers 44 to 47 store therein the newest data u00, u01, u10 and u11 in the above-mentioned data series, and the data series from the respective selecting circuits 40 to 43, and further output the oldest data v00, v01, v10 or v11 of the stored data series.

Accordingly, the majority operating circuit 48 carries out a majority operation in each of the output data v00, v01, v10 or v11, and outputs as a decoded series z (t−td) of the Viterbi decoding unit 11 (namely, the information code Spi).

Here, the time period td indicates a circuit delay in the Viterbi decoding unit 11, and it is determined in accordance with the register length of each of the registers 44 to 47 of the path memory 27.

The above-mentioned decoding process in the Viterbi decoding unit 11 can obtain the decoded series (the information code Spi) in which the distance is the minimum with respect to the series of the input sample x(t) (the sample value series Ssv). This decoded series shows low data error rate and high reliability because the convolutional code has high correction ability and the Viterbi decoding process has accurate judgment ability.

As mentioned above, according to the operation of the information recording and reproducing system S of the embodiment, when the information is recorded, the record symbol Srs generated by the encoding process using the convolutional code is recorded onto the optical disc 1 by changing the shape of the pit PT in the several steps. Also, when the information is reproduced, the reproduction laser light is irradiated to the plurality of pits PT, and then the reproduction data Sout is reproduced by the Viterbi decoding process, in accordance with the reflection light. Thus, the error rate the reproduction data Sout can be reduced even if there are the various disturbances when the shape of the pit PT is changed by the several step s.

Also, the above-mentioned pre-coding operation is performed on the multi-level symbol Sts corresponding to one pit PT among the plurality of pits PT in the beam spot BS of the reproduction laser light, and the record symbols Srs corresponding to the other pits PT among the plurality of pits PT to thereby generate the record symbol Srs corresponding to the one pit PT. Thus, it is possible to accurately recover the digital data recorded in the one pit PT from the reflection lights of the plurality of pits PT.

Moreover, since the convolutional code is the punctured code, the record code Sr can be generated at the high encoding rate in recording the information data Sin.

Furthermore, the reproduction performance at the time of the reproduction can be further improved since the mapping unit 4 uses the converting process based on the Gray code in generating the multi-level symbol Sts.

Also, the Viterbi decoding process selects the branch metric having the minimum value among the plurality of branch metrics, and uses the selected few branch metrics in calculating the path metric. Thus, it is possible to miniaturize the Viterbi decoding unit 11 for carrying out the Viterbi decoding process.

Moreover, the edge position of the pit PT is changed by the several steps in recording the record symbol Srs. Thus, it is possible to accurately and easily record the pit PT having the shape corresponding to the multi-level symbol Sts, and also possible to accurately and easily reproduce the analog reproduction signal Spa corresponding to the sum of the record symbols Srs recorded in the plurality of pits PT, and accordingly possible to accurately reproduce the reproduction data Sout.

(II) Modified Embodiment

The modified embodiment of the present invention will be described below.

At first, the convolutional encoding process in the convolutional encoding unit 3 is not limited to the above-mentioned case. For example, it can be applied to various convolutional codes noted in the document of ("Punctured Convolutional Codes of Rate (n−1)/n and Simplified Maximum Likelihood Decoding" IEEE Transactions on Information Theory, Vol.IT–25, No. 1, January 1979).

Also, the encoding rate of the convolutional code is not limited to the case of R=3/4 in the embodiment. For example, a convolutional code of an encoding rate R=1/2 may be used to encode an information code Se of one bit to a record code Sr of two bits, and may be converted into one multi-level symbol Sts having four levels.

Also, a convolutional code of an encoding rate R=2/3 may be used to encode an information code Se of two bit to a record code Sr of three bits, and may be converted into one multi-level symbol Sts having eight levels.

Moreover, the decoding method of the convolutional code is not limited to the Viterbi decoding. That is, a sequential decoding method can be used which is well known as another maximum likelihood decoding method of the convolutional code.

Also, the method for carrying out the multi-level record of the information data Sin on the optical disc 1 is not limited to the pit edge multi-level recording method. For example, the present invention can be applied to a multi-level recording by changing a shape of a pit, a multi-level recording by changing an arrangement of pits, a multi-level recording by modulating a depth of a pit, a multi-level recording by modulating a magnetic intensity of a magneto-optical disc, and the like.

(III) Example of Information Recording and Reproducing System of Embodiment

The result of computer simulation for the performance evaluation of the information recording and reproducing systems in both the conventional technique and the present invention will be described below with reference to FIG. 9, in order to prove the effect of the present invention.

At first, the configuration of the simulation system is described which corresponds to the information recording and reproducing system of the embodiment.

Figure 10:
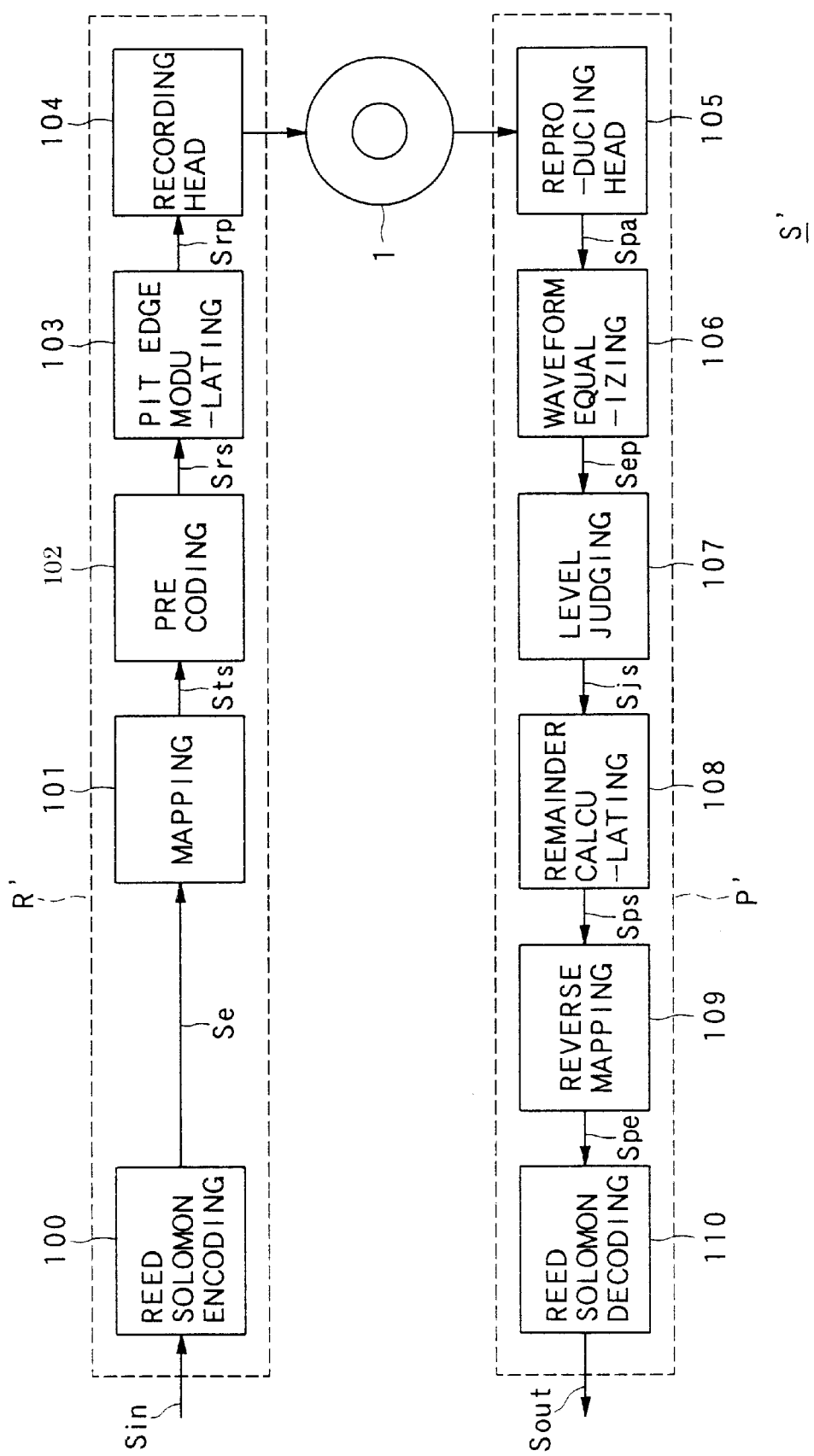
FIG. 10 is a block diagram showing a schematic configuration of a conventional information recording and reproducing system.
Figure 11:
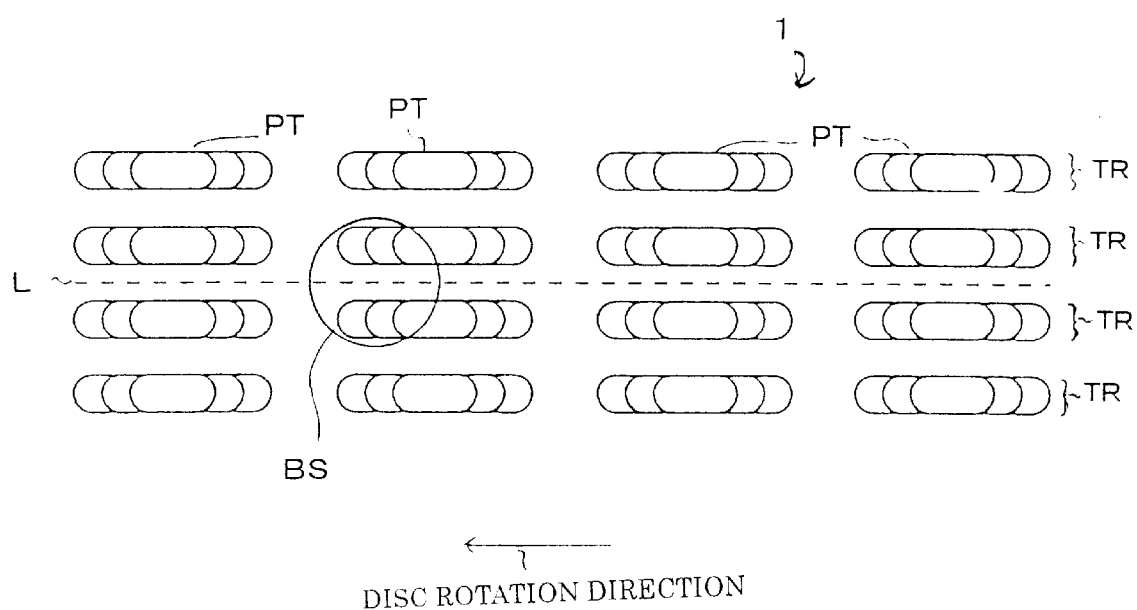
FIG. 11 is an enlarged plan view showing a pit shape in a conventional optical disc.
Figure 12A:
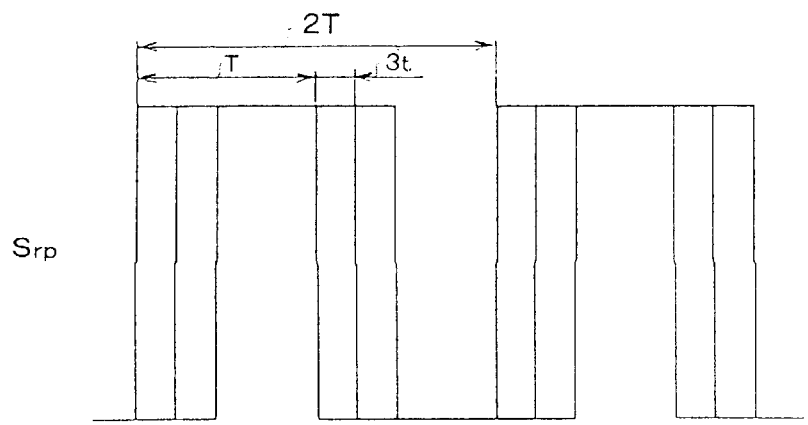
FIG. 12A is a timing chart showing an example of a waveform of a record pulse, in a conventional recording and reproducing process.
Figure 12B:
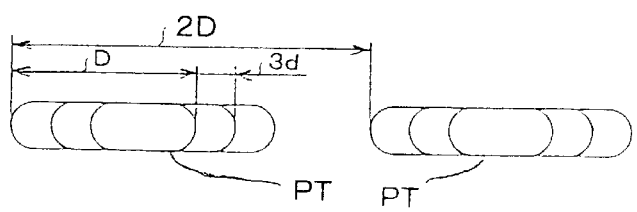
FIG. 12B is an enlarged plan view showing a pit shape in the optical disc in a conventional recording and reproducing process.
Figure 12C:
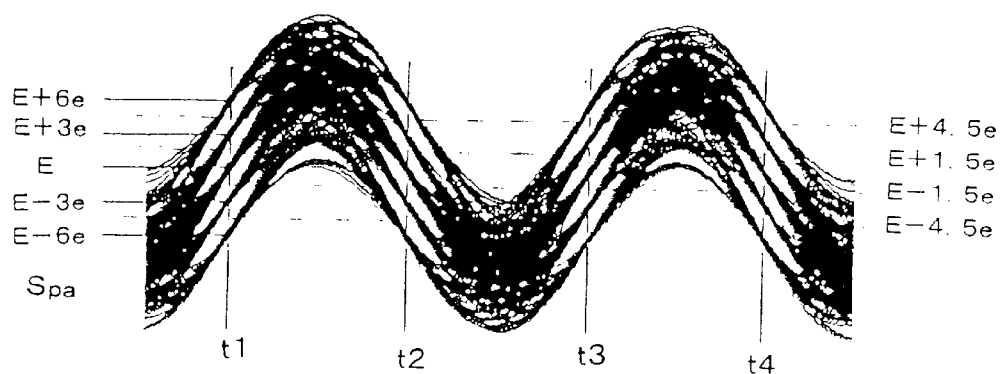
FIG. 12C is a timing chart showing an example of a waveform in an analog reproduction signal in a conventional recording and reproducing process.

The example described in FIG. 10 is used as for the conventional information recording and reproducing system.

That is, the mapping unit 101 divides an information code Se, in which a data rate is 13.5 MHz, for each three bits, and then converts it into two multi-level symbols Sts having a tree-value level.

Also, the pre-coding unit 102 converts the multi-level symbol Sts having the three levels into a record symbol Srs having the three levels as well.

Then, the pit edge modulating unit 103 generates a record pulse Srp in which a leading position and a trailing position are changed by three steps, and forms a pit PT having a corresponding shape on the optical disc 1, and then records a information data Sin.

Here, disc noise in the optical disc 1 is simulated by adding white noise to the record pulse Srp.

On the other hand, at a time of the reproduction, a reproduction head 105, in which a wave length of a reproduction laser light is 635 nm and a numerical aperture (NA) of an objective lens is 0.6, is used to simultaneously read two pit edges existing on two tracks of the optical disc 1 rotating at a linear velocity of 4 m/sec and then generate an analog reproduction signal Spa.

The waveform equalizer 106 has a frequency transmission characteristic represented by a following equation (11).

$$H(\omega)=1+0.5\times\cos(\omega Ts)-0.5\times\cos(2\omega Ts) \quad (11)$$

Here, Ts=1/18 ($\mu$sec)

In accordance with this equation, the waveform equalizer 106 filters the analog reproduction signal Spa.

Next, the level judging unit 107 samples the filtered analog reproduction signal Sep, and compares its voltage level with four threshold levels, and then generates a five-level judgment symbol Sjs.

Then, the remainder calculating unit 108 recovers a three-level reproduction symbol Sps from the five-level judgment symbol Accordingly, the reverse mapping unit 109 recovers a reproduction information code Spe from the reproduction symbol Sps.

Then, in this simulation, the reproduction information code Spe generated by the above-mentioned processes is compared with the information code Se prior to the recording operation, and then a bit error rate is calculated.

On the other hand, the information recording and reproducing system of the present invention uses the example described in FIG. 1.

At first, the convolutional encoding unit 3 encodes an information code Se of three bits to a record code Sr of four bits.

Next, the mapping unit 4 converts a record code Sr of two bits into a multi-level symbol Sts of four levels.

Then, the pre-coding unit 5 converts the multi-level symbol Sts of the four levels into a record symbol Srs of the similar four levels.

Accordingly, the pit edge modulating unit 6 generates a record pulse Srp in which a leading position and a trailing position are changed by four steps, and forms a pit PT having a corresponding shape on the optical disc 1, and then records the information data Sin.

On the other hand, at a time of the reproduction, the A/D converter 10 performs the A/D conversion onto the re-shaped analog reproduction signal Sep filtered in accordance with the characteristic indicated by the equation (11), and then generates a sample value series Ssv.

The Viterbi decoding unit 11 performs the Viterbi decoding process onto the sample value series Ssv, and then recovers the information code Spi.

Then, in this simulation, the information code Spi generated by the above-mentioned processes is compared with the information code Se prior to the recording operation, and then a bit error rate is calculated. At this time, various conditions other than the above-mentioned conditions are perfectly identical to those of the conventional case.

Figure 9A:
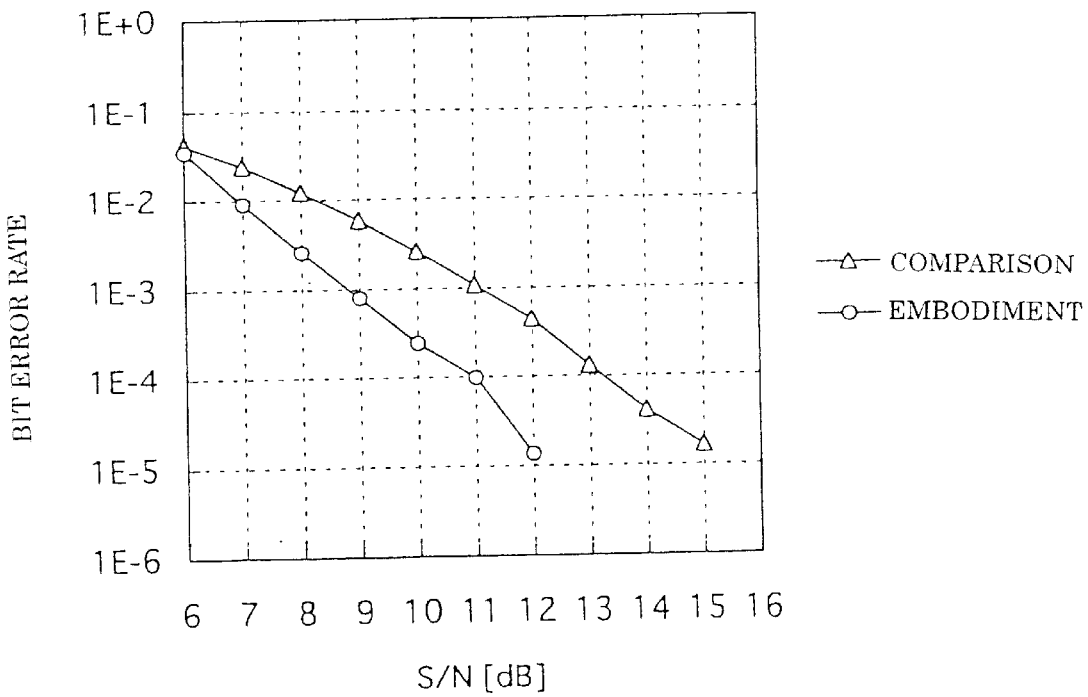
FIG. 9A is a graph indicating one example describing the effect of the present invention.

FIG. 9A shows the simulation result using the above-mentioned simulation system.

As can be seen from FIG. 9A, the present invention demonstrates a lower bit error rate in an actual usage area having a certain degree of a high S/N ratio, and thereby provides an excellent record/reproduction performance.

In other words, according to the present invention, it can be understood that the S/N ratio necessary for the achievement of the same error rate may be low (this difference between the S/N ratios is referred to as a coding gain). For example, in the case of FIG. 9A in the present invention, a coding gain of 2.2 dB is obtained at a bit error rate of $1\times10^{-1}$.

(IV) Example of Information Recording and Reproducing System of Modified Embodiment The similar simulation result with regard to one of the above-mentioned modified embodiment will be described below with reference to FIG. 9B.

Figure 9B:
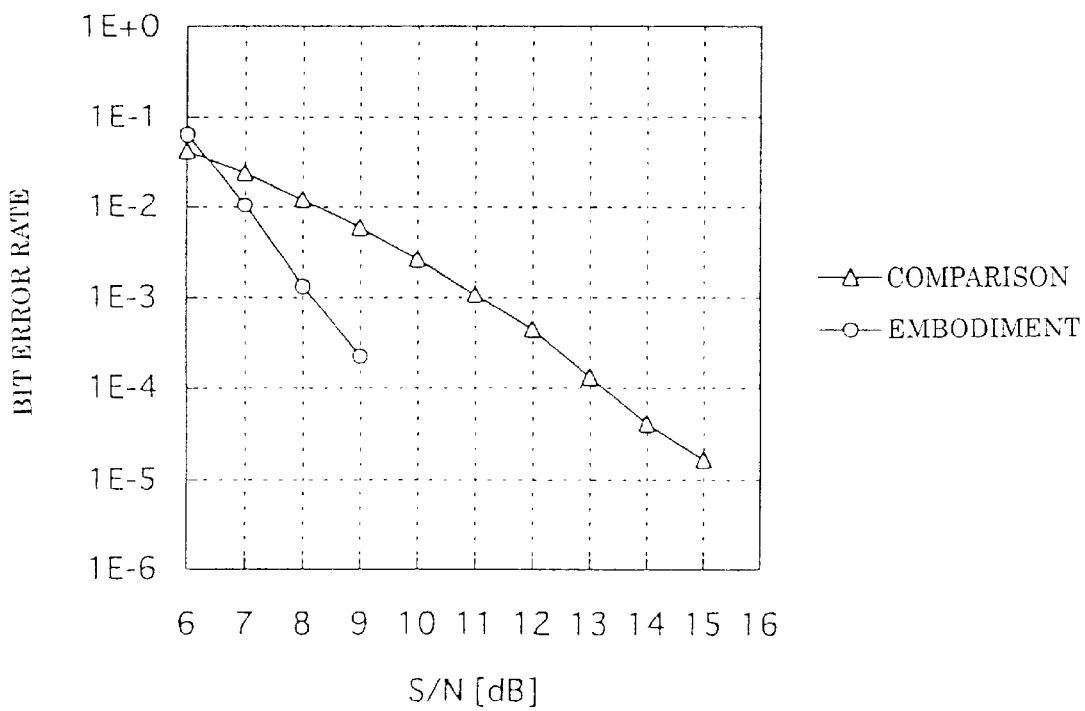
FIG. 9B is a graph indicating another example describing the effect of the present invention.

FIG. 9B shows the simulation result when a convolutional code having a constraint length of $\tau=4$ and a generation coefficient of (31, 27, 23, 23) is used among various encoding rates, constraint lengths and generation coefficients noted in the document indicated in the section of the modified embodiment.

It is typically known that if the constraint length is made longer, the correction ability of the convolutional code is made stronger to thereby improve the reproduction performance. The simulation result shown in FIG. 9B demonstrates a bit error rate further lower than that in FIG. 9A. Also, it is understood that a coding gain of 2.9 dB is obtained at the bit error rate of $1\times10^{-3}$.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-160196 filed on Jun. 7, 1999 including the specification, claims, drawings and summary is incorporated herein by reference in its entirety.

What is claimed is:

1. An information recording and reproducing method comprising an information recording method of optically recording digital data onto an information recording medium by forming a pit having a shape corresponding to the digital data, and an information reproducing method of optically reproducing the recorded digital data from said information recording medium, (i) said information recording method comprising:
- a record code generating process of applying an encoding process using a convolutional code onto the digital data, to thereby convert the digital data into a record code;
- a multi-level symbol generating process of converting the generated record code corresponding to a plurality of bits into a multi-level symbol having a plurality of values;
- a record symbol generating process of applying a logical converting process onto the generated multi-level symbol to thereby convert the multi-level symbol into a record symbol; and
- a recording process of recording the record symbol onto said information recording medium by optically forming the pit on said information recording medium while changing the shape of the pit by several steps in correspondence with a value of the generated record symbol, (ii) said information reproducing method comprising:
- an irradiating process of irradiating a light beam for reproducing the digital data so that an irradiation range of the light beam on said information recording medium covers a plurality of pits;
- a detecting process of detecting the record symbol as an analog detection signal, on the basis of a reflection light of the light beam from the irradiation range;
- an analog-to-digital converting process of converting the analog detection signal into a sample value series, which is a digital signal; and
- a recovering process of applying a Viterbi decoding process onto the converted sample value series to thereby recover the digital data.

2. An information recording and reproducing method according to claim 1, wherein said record symbol generating process comprises a pre-coding process of applying a pre-coding operation, which is set in advance in correspondence with said detecting process, onto (i) the multi-level symbol corresponding to one pit of the plurality of pits, which are within the irradiation range in said irradiating process, and (ii) the record symbol corresponding to another pit of the plurality of pits, which are within the irradiation range in said irradiating process, to thereby generate the record symbol corresponding to said one pit.

3. An information recording and reproducing method according to claim 1, wherein the convolutional code is a punctured code.

4. An information recording and reproducing method according to claim 1, wherein, in said multi-level symbol generating process, a converting process based on a Gray code is used to generate the multi-level symbol.

5. An information recording and reproducing method according to claim 1, wherein a branch metric calculating process in said Viterbi decoding process compares values of a plurality of branch metrics with each other, and selects one branch metric having a minimum value.

6. An information recording and reproducing method according to claim 1, wherein
in said recording process, the pit is formed by changing an edge position of the pit by several steps in accordance with the value of the generated record symbol, and
in said irradiating process, the light beam is irradiated such that a plurality of edge positions of the pits are within the irradiation range.

7. An information recording and reproducing system comprising an information recording apparatus for optically recording digital data onto an information recording medium by forming a pit having a shape corresponding to the digital data, and an information reproducing apparatus for optically reproducing the recorded digital data from said information recording medium, (i) said information recording apparatus comprising:
- a record code generating device for applying an encoding process using a convolutional code onto the digital data, to thereby convert the digital data into a record code;
- a multi-level symbol generating device for converting the generated record code corresponding to a plurality of bits into a multi-level symbol having a plurality of values;
- a record symbol generating device for applying a logical converting process onto the generated multi-level symbol to thereby convert the multi-level symbol into a record symbol; and
- a recording device for recording the record symbol onto said information recording medium by optically forming the pit on said information recording medium while changing the shape of the pit by several steps in correspondence with a value of the generated record symbol, (ii) said information reproducing apparatus comprising:
- an irradiating device for irradiating a light beam for reproducing the digital data so that an irradiation range of the light beam on said information recording medium covers a plurality of pits;
- a detecting device for detecting the record symbol as an analog detection signal, on the basis of a reflection light of the light beam from the irradiation range;
- an analog-to-digital converting device for converting the analog detection signal into a sample value series, which is a digital signal; and
- a recovering device for applying a Viterbi decoding process onto the converted sample value series to thereby recover the digital data.

8. An information recording apparatus for optically recording digital data onto an information recording medium by forming a pit having a shape corresponding to the digital data, which is optically reproduced from said information recording medium by irradiating a light beam for reproducing the digital data so that an irradiation range of the light beam on said information recording medium covers a plurality of pits and by applying a Viterbi decoding process onto an analog signal detected on the basis of a reflection light of the light beam from the irradiation range, said information recording apparatus comprising:

- a record code generating device for applying an encoding process using a convolutional code onto the digital data, to thereby convert the digital data into a record code;
- a multi-level symbol generating device for converting the generated record code corresponding to a plurality of bits into a multi-level symbol having a plurality of values;
- a record symbol generating device for applying a logical converting process onto the generated multi-level symbol to thereby convert the multi-level symbol into a record symbol; and a recording device for recording the record symbol onto said information recording medium by optically forming the pit on said information recording medium while changing the shape of the pit by several steps in correspondence with a value of the generated record symbol.

9. An information recording apparatus according to claim 8, wherein said record symbol generating device comprises a pre-coding device for applying a pre-coding operation, which is set in advance in correspondence with a reproducing process for the digital data, onto (i) the multi-level symbol corresponding to one pit of the plurality of pits, which are within the irradiation range in the reproducing process, and (ii) the record symbol corresponding to another pit of the plurality of pits, which are within the irradiation range in the reproducing process, to thereby generate the record symbol corresponding to said one pit.

10. An information recording apparatus according to claim 8, wherein the convolutional code is a punctured code.

11. An information recording apparatus according to claim 8, wherein, in said multi-level symbol generating device, a converting process based on a Gray code is used to generate the multi-level symbol.

12. An information recording apparatus according to claim 8, wherein by said recording device, the pit is formed by changing an edge position of the pit by several steps in accordance with the value of the generated record symbol, and in a reproducing process for the digital data, the light beam is irradiated such that a plurality of edge positions of the pits are within the irradiation range.

13. An information reproducing apparatus for optically reproducing digital data from an information recording medium, on which the digital data is recorded by (i) applying an encoding process using a convolutional code onto the digital data, to thereby convert the digital data into a record code, (ii) converting the generated record code corresponding to a plurality of bits into a multi-level symbol having a plurality of values, (iii) applying a logical converting process onto the generated multi-level symbol to thereby convert the multi-level symbol into a record symbol, and (iv) recording the record symbol onto said information recording medium by optically forming a pit having a shape corresponding to the digital data on said information recording medium while changing the shape of the pit by several steps in correspondence with a value of the generated record symbol, said information reproducing apparatus comprising:

an irradiating device for irradiating a light beam for reproducing the digital data so that an irradiation range of the light beam on said information recording medium covers a plurality of pits;

a detecting device for detecting the record symbol as an analog detection signal, on the basis of a reflection light of the light beam from the irradiation range;

an analog-to-digital converting device for converting the analog detection signal into a sample value series, which is a digital signal; and a recovering device for applying a Viterbi decoding process onto the converted sample value series to thereby recover the digital data.

14. An information reproducing apparatus according to claim 13, wherein a branch metric calculating process in said Viterbi decoding process compares values of a plurality of branch metrics with each other, and selects one branch metric having a minimum value.

* * * * *